US012803699B2

(12) United States Patent
Winzer

(10) Patent No.: US 12,803,699 B2
(45) **Date of Patent: *Nov. 17, 2026**

(54) POLARIZATION-DIVERSITY OPTICAL POWER SUPPLY

(71) Applicant: Ciena Corporation, Hanover, MD (US)

(72) Inventor: Peter Johannes Winzer, Aberdeen, NJ (US)

(73) Assignee: CIENA CORPORATION, Fulton, MD (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/952,358

(22) Filed: Nov. 19, 2024

(65) Prior Publication Data

US 2025/0080267 A1 Mar. 6, 2025

Related U.S. Application Data

(63) Continuation of application No. 18/130,327, filed on Apr. 3, 2023, now Pat. No. 12,184,402, which is a (Continued)

(51) Int. Cl.
*H04J 14/06* (2006.01)
*H04B 10/532* (2013.01)
*H04B 10/564* (2013.01)

(52) U.S. Cl.
CPC ............ *H04J 14/06* (2013.01); *H04B 10/532* (2013.01); *H04B 10/564* (2013.01)

(58) Field of Classification Search
None
See application file for complete search history.

(56) References Cited

U.S. PATENT DOCUMENTS 4,346,478 A 8/1982 Sichling
4,449,043 A 5/1984 Husbands
(Continued)

FOREIGN PATENT DOCUMENTS

EP 0075699 B1 6/1986
JP 2004-135700 A 5/2004
(Continued)

OTHER PUBLICATIONS

Acacia-inc.com [online], "Coherent Optical Solutions for Data Center Interconnections," Optinet 2019, Jun. 13, 2019, retrieved on Aug. 15, 2022, retrieved from URL<https://acacia-inc.com/wp-content/uploads/2019/06/Optinet-China-2019_Acacia_Fenghai-Liu_UpLoad_v1.pdf>, 13 pages.

(Continued)

*Primary Examiner* — Jai M Lee
(74) *Attorney, Agent, or Firm* — Michael Best & Friedrich LLP

(57) ABSTRACT

Provided is an optical communication system comprising a polarization-diversity optical power supply capable of supplying light over a non-polarization-maintaining optical fiber to a polarization-sensitive modulation device. In an example embodiment, the polarization-diversity optical power supply operates to accommodate random polarization fluctuations within the non-polarization-maintaining optical fiber and enables an equal-power split at a passive polarization splitter preceding the polarization-sensitive modulation device.

35 Claims, 7 Drawing Sheets

Related U.S. Application Data continuation of application No. 16/888,890, filed on Jun. 1, 2020, now Pat. No. 11,621,795.

(56) References Cited

U.S. PATENT DOCUMENTS 4,525,873 A 6/1985 Baues
5,107,358 A * 4/1992 Hodgkinson ........ H04B 14/008 398/79
5,111,322 A * 5/1992 Bergano .................. H04J 14/06 385/47
5,136,410 A 8/1992 Heiling et al.
5,491,576 A * 2/1996 Bergano ............. H04B 10/2572 398/152
5,654,818 A 8/1997 Yao
5,790,287 A 8/1998 Darcie et al.
6,284,975 B1 9/2001 McCord et al.
6,321,013 B1 11/2001 Hardwick, III et al.
6,646,774 B1 11/2003 Willner
6,839,516 B2 1/2005 Lee et al.
6,959,152 B2 10/2005 Fujiwara
7,106,970 B2 9/2006 Fujiwara
7,289,728 B2 10/2007 Wang et al.
7,445,389 B2 11/2008 Aronson
7,646,990 B2 1/2010 Weber et al.
7,831,049 B1 * 11/2010 Kanter ................... H04K 1/006 380/54
8,032,021 B2 10/2011 Cole et al.
8,032,025 B2 * 10/2011 Ibragimov ......... H04B 10/0775 398/152
8,073,326 B2 * 12/2011 Yan ......................... H04J 14/06 398/152
8,135,287 B2 * 3/2012 Yu ........................ H04B 10/548 398/186
8,705,955 B2 4/2014 Grobe et al.
8,761,560 B1 6/2014 Sanderson et al.
8,913,899 B2 12/2014 Neilson et al.
8,929,729 B2 1/2015 Nguyen
9,059,798 B2 6/2015 Figueria et al.
9,781,546 B2 10/2017 Barrett et al.
9,794,195 B1 10/2017 Wilson et al.
9,832,055 B2 * 11/2017 Kuschnerov ........ H04L 27/2697
10,014,943 B2 7/2018 Testa et al.
10,054,749 B1 8/2018 Wang et al.
10,222,676 B2 3/2019 Wen
10,330,875 B2 * 6/2019 Fini ...................... G02B 6/4246
10,404,400 B2 9/2019 Chen
10,461,863 B2 10/2019 Testa et al.
10,951,344 B2 3/2021 Matsuda et al.
11,051,422 B2 6/2021 Norton et al.
11,137,561 B2 10/2021 Tamate
11,153,670 B1 10/2021 Winzer
11,194,109 B2 12/2021 Winzer et al.
11,287,585 B2 3/2022 Winzer
11,621,795 B2 4/2023 Winzer
12,066,653 B2 8/2024 Winzer et al.
12,101,129 B2 9/2024 Winzer
12,164,142 B2 12/2024 Winzer et al.
12,184,402 B2 12/2024 Winzer
12,250,027 B2 3/2025 Winzer
2001/0046074 A1 11/2001 Kakizaki et al.
2002/0003641 A1 1/2002 Hall et al.
2003/0007216 A1 1/2003 Chraplyvy et al.
2003/0081287 A1 5/2003 Jannson et al.
2003/0090760 A1 5/2003 Glingener
2003/0175033 A1 * 9/2003 Taga ....................... H04J 14/06 398/140
2004/0016874 A1 1/2004 Rao et al.
2004/0027462 A1 2/2004 Hing
2004/0208600 A1 10/2004 Guenter et al.
2004/0213512 A1 10/2004 Wu et al.
2006/0029395 A1 2/2006 Kim et al.
2007/0077072 A1 4/2007 Kunimatsu et al.
2007/0166046 A1 7/2007 Hecker et al.
2008/0056731 A1 3/2008 Weber et al.
2008/0166133 A1 7/2008 Hsiao
2008/0259566 A1 10/2008 Fried
2008/0267620 A1 10/2008 Cole et al.
2009/0067843 A1 * 3/2009 Way .................... H04J 14/0246 398/43
2009/0234936 A1 9/2009 Bandholz et al.
2010/0150559 A1 6/2010 Essiambre et al.
2010/0209114 A1 8/2010 Gloeckner et al.
2010/0265658 A1 10/2010 Sawai et al.
2011/0044702 A1 2/2011 Mizuguchi et al.
2011/0150486 A1 6/2011 Davidson et al.
2011/0157688 A1 6/2011 Wang
2011/0188815 A1 8/2011 Blackwell et al.
2011/0261427 A1 10/2011 Hart et al.
2012/0106978 A1 5/2012 Jenson
2013/0102237 A1 4/2013 Zhou et al.
2013/0279916 A1 10/2013 Cho et al.
2013/0342993 A1 12/2013 Singleton
2014/0327902 A1 11/2014 Giger et al.
2015/0079832 A1 3/2015 Gordon
2015/0247980 A1 9/2015 Bradley et al.
2015/0261269 A1 9/2015 Bruscoe
2016/0216445 A1 7/2016 Thacker et al.
2016/0269114 A1 9/2016 Beck
2017/0131469 A1 5/2017 Kobrinsky et al.
2018/0217468 A1 8/2018 Wen et al.
2018/0278332 A1 9/2018 Leigh et al.
2018/0306990 A1 10/2018 Badihi
2019/0098788 A1 3/2019 Leigh et al.
2019/0173577 A1 6/2019 Coffey et al.
2019/0379952 A1 12/2019 Iannone et al.
2020/0015386 A1 1/2020 Gupta
2020/0021899 A1 1/2020 Stojanovic et al.
2020/0033544 A1 1/2020 Costello
2020/0053904 A1 2/2020 Panella et al.
2020/0067626 A1 2/2020 Dupuis
2020/0301084 A1 9/2020 Champion et al.
2020/0343990 A1 10/2020 Nagarajan
2021/0211785 A1 7/2021 Rose et al.
2021/0286140 A1 9/2021 Winzer
2021/0294052 A1 9/2021 Winzer
2021/0345025 A1 11/2021 Winzer
2021/0376950 A1 12/2021 Winzer
2022/0094449 A1 3/2022 Suyama
2022/0114125 A1 4/2022 Thakur et al.
2022/0141949 A1 5/2022 Devalla et al.
2022/0159860 A1 5/2022 Winzer et al.
2022/0244465 A1 8/2022 Winzer et al.
2022/0263586 A1 8/2022 Winzer et al.
2022/0264759 A1 8/2022 Sawyer et al.
2022/0279256 A1 9/2022 Chaouch et al.
2023/0018654 A1 1/2023 Winzer et al.
2023/0043794 A1 2/2023 Winzer
2023/0077979 A1 3/2023 Winzer
2023/0083467 A1 3/2023 Winzer
2023/0161109 A1 5/2023 Pupalaikis et al.
2023/0176304 A1 6/2023 Winzer et al.
2023/0188208 A1 6/2023 Igarashi et al.
2023/0254046 A1 8/2023 Winzer
2023/0354541 A1 11/2023 Cole et al.
2023/0375793 A1 11/2023 Winzer et al.
2024/0036254 A1 2/2024 Winzer et al.
2024/0056213 A1 2/2024 Winzer
2024/0118484 A1 4/2024 Winzer et al.
2025/0015902 A1 1/2025 Winzer
2025/0147225 A1 5/2025 Winzer et al.
2025/0293785 A1 9/2025 Winzer

FOREIGN PATENT DOCUMENTS

WO WO 2012/003856 A1 1/2012
WO WO 2020/246375 A1 12/2020
WO WO 2021/183792 A1 9/2021

(56) References Cited

FOREIGN PATENT DOCUMENTS

WO WO 2021/188648 A1 9/2021
WO WO 2021/211725 A1 10/2021

OTHER PUBLICATIONS

Amazon.com [online], "IBM Midplane BOARD-8852Refurbished, 25R5780Refurbished)," Jun. 30, 2014, retrieved on Nov. 22, 2022, retrieved from URL< https://www.amazon.com/IBM-MIDPLANE-BOARD-8852-Refurbished-25R5780/dp/B00LEQ2URK>, 2 pages.
Ayar Labs "Optical I/O Chiplets Eliminate Bottlenecks to Unleash Innovation," Ayar Labs Resources, Technical Paper, 2019, 9 pages.
Ayarlabs.com [online], "In-Package Optical I/O: Unleashing Innovation," May 19, 2021, retrieved on Jun. 14, 2022, retrieved from URL<https://ayarlabs.com/in-package-optical-i-o-unleashing-innovation/>, 3 pages.
Burns et al., "Depolarized source for fiber-optic applications," Optics Letters, Mar. 15, 1991, 16(6):381-383.
Burns et al., "Depolarized source for fiber-optic applications: erratum," Optics Letters, Dec. 1, 1991, 16(23):1905.
Copackageoptics.com [online], "Co-Packaged Optical Module Discussion Document," 2019, retrieved on Jun. 14, 2022, retrieved from URL<http://www.copackagedoptics.com/wp-content/uploads/2019/11/CPO-Module-Discussion-Doc-V1.0Final.pdf>, 18 pages.
Epic-assoc.com [online], "Co-Packaged Optics Integration," EPIC Online Technology Meeting on Co-Packaged Optics, Jun. 8, 2020, retrieved on Aug. 15, 2022, retrieved from <https://epic-assoccom/wp-content/uploads/2021/06/Brian-Welch_Cisco.pdf>, 4 pages.
Eps.ieee.org [online], "Chapter 9: Integrated Photonics," Heterogeneous Integration Roadmap, 2019 Edition, Oct. 2019, retrieved on Aug. 15, 2022, retrieved from <https://eps.ieee.org/images/files/HIR_2021/ch09_photonics.pdf>, 16 pages.
Extended European Search Report in European Appln. No. 21817095.9, dated Jul. 24, 2024, 10 pages.
Extended European Search Report in European Appln. No. 22195959, dated Feb. 10, 2023, 13 pages.
Fs.com [online], "1m (3ft) MTP® Female to 4 LC UPC Duplex 8 Fibers Type B Plenum (OFNP) OM4 50/125 Multimode Elite Breakout Cable, Magenta," Nov. 2020, retrieved on Jun. 14, 2022, retrieved from URL<https://www.fs.com/products/68047.html>, 5 pages.
International Preliminary Report on Patentability in International Appln. No. PCT/US2021/035179, mailed on Dec. 15, 2022, 14 pages.
International Preliminary Report on Patentability in International Appln. No. PCT/US2022/015110, mailed Aug. 17, 2023, 14 pages.
International Preliminary Report on Patentability in International Appln. No. PCT/US2022/071857, mailed on Nov. 2, 2023, 23 pages.
International Search Report and Written Opinion in International Appln. No. PCT/US2022/015110, mailed Jul. 8, 2022, 31 pages.
International Search Report and Written Opinion in International Appln. No. PCT/US2022/071857, mailed Jun. 29, 2022, 25 pages.
Invitation to Pay Additional Fees in International Appln. No. PCT/US2022/015110, dated May 3, 2022, 3 pages.
Lach et al., Modulation formats for 100G and beyond, Elsevier Inc., Aug. 26, 2011, pp. 377-386.
Mapyourtech.com [online], "Understanding Optical Return Loss (ORL) in Optical Fiber system," Apr. 29, 2020, retrieved on Jan. 27, 2023, retrieved from URL<https://mapyourtech.com/2020/04/understanding-optical-return-loss-orl-in-optical-fiber-system/>, 9 pages.
Pan et al., "Intra-Bit Polarization Diversity Modulation for PMD Mitigation," Proceedings of the European Conference on Optical Communications (ECOC), Amsterdam, The Netherlands, Sep. 30-Oct. 4, 2001, paper We.P37, pp. 450-451.
PCT International Invitation to Pay Additional Fees in International Appln. No. PCT/US2021/035179, dated Jul. 30, 2021, 2 pages.
PCT International Search Report and Written Opinion in International Appln. No. PCT/US2021/035179, dated Oct. 20, 2021, 17 pages.
Raj et al., "50Gb/s Hybrid Integrated Si-Photonic Optical Link in 16nm FinFET," 2020 European Conference on Optical Communications (ECOC), Dec. 6-10, 2020, 4 pages.
Raj et al., "Design of a 50-Gb/s Hybrid Integrated Si-Photonic Optical Link in 16-nm FinFET," IEEE Journal of Solid-State Circuits, Apr. 2020, 55:1086-1095.
Techpowerup.com [online], "Ayar Labs Raises $130 Million for Light-based Chip-to-Chip Communication," Apr. 27, 2022, retrieved on Jun. 14, 2022, retrieved from URL<https://www.techpowerup.com/294262/ayar-labs-raises-usd-130-million-for-light-based-chip-to-chip-communication>, 4 pages.
Testa et al., "Experimental evaluation of silicon photonics transceiver operating at 120 °C for 5G antenna array systems," Electronic Letters, Nov. 29, 2018, 54(24):1391-1393.
Vimeo.com [online], "In-Package Optical I/O: Unleashing Innovation," Ayar Labs, May 17, 2021, retrieved Aug. 15, 2022, retrieved from <https://vimeo.com/551707515?embedded=true&source=video_title&owner=82726955>, Video Frames from 0:18 to 1:42, 16 pages.

* cited by examiner

100

290

290

290

290

290

290

290

POLARIZATION-DIVERSITY OPTICAL POWER SUPPLY

CROSS-REFERENCE TO RELATED APPLICATIONS

This application is a continuation of U.S. patent application Ser. No. 18/130,327, filed on Apr. 3, 2023, which claims benefit of U.S. patent application Ser. No. 16/888,890, filed on Jun. 1, 2020, issued as U.S. Pat. No. 11,621,795 on Apr. 4, 2023. The disclosures of the prior applications are incorporated by reference in their entirety.

BACKGROUND

Field

Various example embodiments relate to optical communication equipment and, more specifically but not exclusively, to optical power supplies.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of an optical communication system comprising a polarization-diversity optical power supply capable of supplying light over a non-polarization-maintaining optical fiber to a polarization-sensitive modulation device. In an example embodiment, the polarization-diversity optical power supply operates to accommodate random polarization fluctuations within the non-polarization-maintaining optical fiber and enables an equal-power split at a passive polarization splitter preceding the polarization-sensitive modulation device.

According to one embodiment, provided is an apparatus for communicating optical signals modulated at a symbol rate, the apparatus comprising an optical power supply that comprises: a light source and an electronic controller connected to the light source to cause the light source to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source at different respective input ports thereof, the polarization combiner being configured to generate, at an output port thereof, an optical output in which first and second mutually orthogonal polarization components carry light of the first and second light outputs, respectively.

In some embodiments of the above apparatus, the electronic controller is configured to cause the first light output and the second light output to be mutually time/frequency orthogonal.

In some embodiments of any of the above apparatus, a degree to which the first light output and the second light output are time/frequency orthogonal is greater than 0.8.

In some embodiments of any of the above apparatus, the degree is greater than 0.9.

In some embodiments of any of the above apparatus, the degree is greater than 0.99.

In some embodiments of any of the above apparatus, the first light output comprises a first continuous-wave optical field at the first optical frequency, and the second light output comprises a second continuous-wave optical field at the second optical frequency.

In some embodiments of any of the above apparatus, a difference between the first optical frequency and the second optical frequency is greater than five times the symbol rate.

In some embodiments of any of the above apparatus, a difference between the first optical frequency and the second optical frequency is approximately an integer multiple of the symbol rate.

In some embodiments of any of the above apparatus, the first light output comprises a first optical pulse train of a first period, and the second light output comprises a second optical pulse train of the first period.

In some embodiments of any of the above apparatus, pulses of the first and second optical pulse trains have a same intensity waveform.

In some embodiments of any of the above apparatus, pulses of the first and second optical pulse trains have different respective intensity waveforms.

In some embodiments of any of the above apparatus, the first and second optical pulse trains are phase-locked with respect to one another.

In some embodiments of any of the above apparatus, centers of pulses of the first optical pulse train are temporally aligned with centers of corresponding pulses of the second optical pulse train.

In some embodiments of any of the above apparatus, centers of pulses of the first optical pulse train are temporally offset from centers of corresponding pulses of the second optical pulse train by a nonzero time shift.

In some embodiments of any of the above apparatus, the nonzero time shift is smaller than one half the first period.

In some embodiments of any of the above apparatus, the nonzero time shift is smaller than one quarter of the first period.

In some embodiments of any of the above apparatus, the difference between the first optical frequency and the second optical frequency is twice the pulse repetition rate.

In some embodiments of any of the above apparatus, the difference between the first optical frequency and the second optical frequency is three times the pulse repetition rate.

In some embodiments of any of the above apparatus, a spectrum of the first pulse train has two first optical frequency tones; and a spectrum of the second pulse train has two second optical frequency tones different from the two first optical frequency tones.

In some embodiments of any of the above apparatus, the first and second optical frequency tones are equidistantly spaced by an integer multiple of the symbol rate.

In some embodiments of any of the above apparatus, the integer multiple is two.

In some embodiments of any of the above apparatus, the electronic controller is further configured to imprint first control information on the first light output of the light source and second control information on the second light output of the light source.

In some embodiments of any of the above apparatus, the first control information is identical to the second control information.

In some embodiments of any of the above apparatus, the electronic controller imprints the first and second control information using one or more of: an intensity, a phase, a frequency, and a polarization of the first light output and the second light output.

In some embodiments of any of the above apparatus, the light source comprises a first CW laser oscillating at the first optical frequency, and a second CW laser oscillating at the second optical frequency.

In some embodiments of any of the above apparatus, the electronic controller is configured to control the first CW laser and the second CW laser to controllably set a frequency difference between the first and second optical frequencies.

In some embodiments of any of the above apparatus, the polarization combiner comprises one or more of: a polarization beam combiner, a polarization-maintaining optical power combiner, and a polarization-maintaining wavelength multiplexer.

In some embodiments of any of the above apparatus, the light source comprises a CW laser and an optical modulator optically connected to the CW laser, the optical modulator configured to generate a first modulation tone at the first optical frequency.

In some embodiments of any of the above apparatus, the electronic controller is configured to control an optical frequency of the first modulation tone.

In some embodiments of any of the above apparatus, the optical modulator is further configured to generate a second modulation tone at the second optical frequency.

In some embodiments of any of the above apparatus, the light source comprises an optical amplitude modulator configured to generate an optical pulse train.

In some embodiments of any of the above apparatus, the light source comprises a pulsed laser configured to generate an optical pulse train.

In some embodiments of any of the above apparatus, the light source comprises an optical delay element configured to delay the first light output with respect to the second light output.

In some embodiments of any of the above apparatus, the optical power supply comprises an optical dispersion-compensating element.

In some embodiments of any of the above apparatus, the light source comprises a polarization-diversity in-phase/quadrature modulator.

In some embodiments of any of the above apparatus: the polarization-diversity in-phase/quadrature modulator is configured to generate two tones in a first polarization and two tones in a second polarization orthogonal to the first polarization; wherein frequency spacing between the two tones in the first polarization and frequency spacing between the two tones in the second polarization are equal to one another; and wherein frequency spacing between a tone in the first polarization and a tone in the second polarization is an integer multiple of said equal frequency spacing.

In some embodiments of any of the above apparatus, the phase difference between the two tones in the first polarization is equal to the phase difference between the two tones in the second polarization.

In some embodiments of any of the above apparatus, the apparatus further comprises an optical transmit module optically end-connected to the output port of the polarization combiner via one or more sections of optical fiber, the transmit module comprising: a polarization splitter having an input port thereof optically connected to an end of one of the sections of the optical fiber to receive light of the optical output; a first optical data modulator connected to a first output of the polarization splitter; and a second optical data modulator connected to a second output of the polarization splitter.

In some embodiments of any of the above apparatus, at least one of the first and second optical data modulators is configured to modulate received light at the symbol rate.

In some embodiments of any of the above apparatus, at least one of the one or more sections of the optical fiber is non-polarization-maintaining.

In some embodiments of any of the above apparatus, the optical fiber is at least one meter long.

In some embodiments of any of the above apparatus, the optical fiber is at least ten meters long.

According to another embodiment, provided is an apparatus comprising an optical transmitter that comprises: a passive polarization splitter having an optical input port and first and second optical output ports, the optical input port being optically connected to receive an optical input signal having first and second polarization components, the first polarization component carrying light of a first optical frequency, the second polarization component carrying light of a second optical frequency different from the first optical frequency, the first and second polarization components being mutually orthogonal and jointly undergoing a state-of-polarization change during a time interval, the passive polarization splitter causing light of a first fixed polarization to be directed from the optical input port to the first optical output port and also causing light of a second fixed polarization to be directed from the optical input port to the second optical output port, the first and second fixed polarizations being orthogonal to one another, the state-of-polarization change causing respective spectral compositions of the lights directed to the first and second optical ports to change during said time interval; and a first optical modulator connected to the first optical output port and configured to modulate the light of the first fixed polarization received therefrom in response to a first data signal.

In some embodiments of the above apparatus, the optical transmitter further comprises a second optical modulator connected to the second optical output port and configured to modulate the light of the second fixed polarization received therefrom in response to a second data signal.

In some embodiments of any of the above apparatus, the first and second optical modulators are connected to transmit the respective modulated lights through different respective optical fibers.

In some embodiments of any of the above apparatus: at some times of said time interval, the first optical modulator receives from the first output port the first optical frequency but not the second optical frequency; and at some other times of said time interval, the first optical modulator receives from the first output port the second optical frequency but not the first optical frequency.

In some embodiments of any of the above apparatus, at yet some other times of said time interval, the first optical modulator receives from the first output port a mix of the first and second optical frequencies.

In some embodiments of any of the above apparatus, the optical input port is optically connected to receive the optical input signal from a proximate end of a section of optical fiber, the optical fiber including at least one section that is non-polarization-maintaining.

In some embodiments of any of the above apparatus, the state-of-polarization change is due to time-varying polarization rotation in said at least one section.

In some embodiments of any of the above apparatus, the time-varying polarization rotation is random.

In some embodiments of any of the above apparatus, the optical transmitter further comprises an optical power supply optically connected to apply the optical input signal through the optical fiber to the passive polarization splitter.

In some embodiments of any of the above apparatus, the optical power supply comprises: a light source and an electronic controller connected to the light source to cause the light source to generate a first light output having the first optical frequency and a second light output having the second optical frequency, each of the first and second light outputs being steady during said time interval; and a polarization combiner connected to receive the first and second light outputs of the light source at different respective input ports thereof, the polarization combiner being configured to generate, at an output port thereof, an optical output that is coupled into the optical fiber to cause the optical input port of the polarization splitter to receive the optical input signal.

In some embodiments of any of the above apparatus, the first optical modulator is a polarization-sensitive device designed to modulate optical signals having the first fixed polarization.

In some embodiments of any of the above apparatus, the first optical modulator is unsuitable for modulating optical signals having the second fixed polarization.

In some embodiments of any of the above apparatus, the second optical modulator is a polarization-sensitive device designed to modulate optical signals having the second fixed polarization.

In some embodiments of any of the above apparatus, the second optical modulator is unsuitable for modulating optical signals having the first fixed polarization.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION OF SOME EMBODIMENTS

Figure 1:
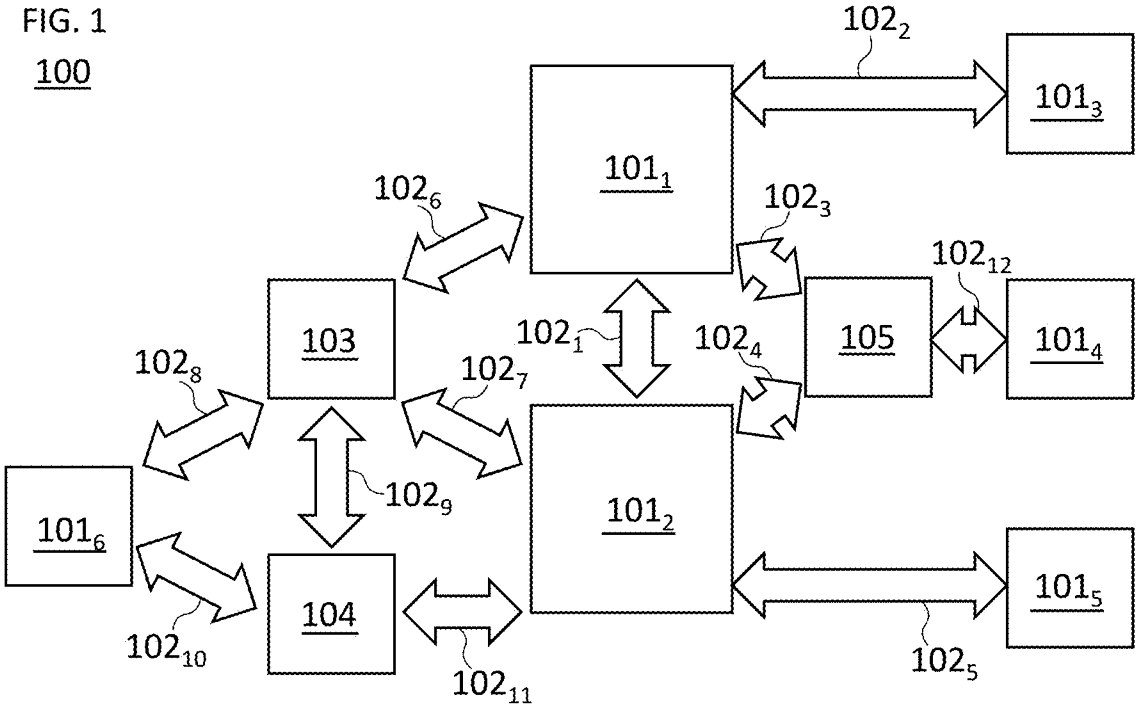
FIG. 1 shows a block diagram of an optical communication system in which at least some embodiments may be practiced.

At least some embodiments may benefit from the use of a light source configured to supply pulsed light for local optical modulation and/or as a clock reference within a corresponding island of synchronicity, e.g., as disclosed in U.S. patent application Ser. No. 16/847,705, which is incorporated herein by reference in its entirety.

Emerging optical interconnects aim to co-package and even co-integrate optical transponders with electronic processing chips, which necessitates transponder solutions that consume relatively low power and that are sufficiently robust against significant temperature variations as may be found within an electronic processing chip package. Of significant interest are massively spatially parallel optical interconnect solutions that multiplex information onto relatively few wavelengths and use a relatively large number of parallel spatial paths for chip-to-chip interconnection. In such systems, it may be beneficial to place the light source outside the package housing the corresponding photonic and electronic processing chips, and to connect the light source to the package via one or more optical fibers. In some such systems, the light source may be placed at a separate location optically connected to the package by, e.g., by at least one meter of optical fiber.

In some such systems, at least some photonic components within the package may be polarization sensitive, i.e., may only accept or may only properly process light of a certain polarization state. For example, a one-dimensional vertical grating coupler, which may serve as a coupling interface to the optical fiber connecting the light source to the package, may only couple light of one particular polarization from the fiber to the photonic processing chip while rejecting, deflecting, or dissipating other light. In another example, an optical modulator integrated within a package may effectively modulate only light in one particular polarization state. In such systems, it may therefore be beneficial to connect the light source with the corresponding electronic and photonic processing chips using polarization-maintaining optical fiber (PMF). However, some systems employing PMF may be more difficult and/or more expensive to manufacture than systems employing standard, non-polarization-maintaining optical fiber (SF), e.g., because PMF may be more expensive than SF, and PMF may require rotationally aligned optical fiber connections. SF, however, may not preserve the polarization state of the light upon its transmission from the light source to the package housing.

Some systems that use SF to connect the light source with a photonic chip may therefore require either an active optical polarization control mechanism or a polarization-diversity setup. In some such systems, polarization diversity may be implemented by doubling the number of data modulators within the package, e.g., as disclosed in U.S. Pat. No. 5,654,818, which is incorporated herein by reference in its entirety. In some such systems, polarization diversity may be implemented by using more-complex optical data modulator structures, e.g., a 4-port optical modulator disclosed in U.S. Pat. No. 10,222,676, which is incorporated herein by reference in its entirety.

U.S. Pat. Nos. 6,959,152 and 7,106,970, which are incorporated herein by reference in their entirety, disclose some systems configured to use temporally interleaved and orthogonally polarized trains of optical pulses at the same optical wavelength. However, such temporal interleaving may lead to a significant timing jitter and/or pulse broadening at the modulator due to random polarization rotations within the corresponding SF.

At least some of the above-indicated problems in the state of the art can be addressed by the use of various embodiments employing a polarization-diversity optical power supply, e.g., as outlined in this specification. For example, a need for PMF may beneficially be circumvented.

FIG. 1 shows a block diagram of a communication system 100 in which at least some embodiments may be practiced. As shown, system 100 comprises nodes 101$_1$-101$_6$, which in some embodiments may each comprise one or more of: optical communication devices, electronic and/or optical switching devices, electronic and/or optical routing devices, network control devices, traffic control devices, synchronization devices, computing devices, and data storage devices. Nodes 101$_1$-101$_6$ may be suitably interconnected by optical fiber links 102$_1$-102$_{12}$ establishing communication paths between the communication devices within the nodes. System 100 may also comprise one or more optical power supply modules 103 producing one or more light supply outputs.

As used herein, a "light supply" or "supplied light" is light intended for use as a modulation carrier in one or more of the optical communication devices of the nodes 101$_1$-101$_6$ whose complex optical field amplitude is "steady." Herein, light is referred to as being "steady" either if said light comprises one or more continuous-wave (CW) optical fields or if said light comprises one or more optical pulse trains of period $T_I$ (where pulse repetition rate $R_I=1/T_I$), each of the pulse trains having a substantially constant respective optical-pulse amplitude and a substantially constant respective optical-pulse duration over a time interval that is significantly longer (e.g., at least by a factor of 100) than the duration $T_S$ of a modulation symbol used for optical communication in system 100. (Hereafter, $R_S=1/T_S$ is referred to as the modulation symbol rate.)

As used herein, light is called "continuous-wave (CW)" if the complex amplitude of the optical field of said light is approximately (e.g., to within +20%) constant over a duration $T_{CW}$ that is much longer than a minimum characteristic duration used by communication signals within system 100. In some embodiments, light may be referred to as being CW light if the complex amplitude of the optical field of said light is approximately constant over at least 100 times the duration $T_S$ of a modulation symbol, i.e., $T_{CW}\geq 100\ T_S$. In some embodiments, light may be referred to as being CW light if the complex amplitude of the optical field of said light is approximately constant over a at least $T_{CW}\geq 1000\ T_S$. In some embodiments, the term "continuous-wave" (or CW) may also be applicable to an optical field affected by random noise, random drifts, or small analog dither modulations using one or more sinewave dither tones at frequencies much lower than $R_S$, e.g., at frequencies smaller than $R_S/1000$, as long as the effect of noise, drift, or dither is not so strong as to induce optical intensity variations, e.g., exceeding ±20% of the average optical intensity within a duration $T_{CW}$.

As used herein, the phrase an "optical pulse train of period $T_I$" refers to an optical field whose optical intensity waveform $I(t)=|E_0(t)|^2$ is periodic with the time period $T_I$. In some embodiments, the complex amplitude $E_0(t)$ of the optical field of an optical pulse train may be periodic with an integer multiple of $T_I$, i.e., with a period of n $T_I$, where n=1, 2, 3, . . . .

As used herein, the term "periodic" refers to a waveform characterized by a parameter or feature (or a change of a parameter or feature) that is repeated every time period T within a duration of time $T_D$, where $T_D$ is significantly larger than T, e.g., $T_D\geq 100$ T. In some cases, the term "periodic" may also be applicable to a waveform affected by random noise, random drifts, or small analog dither modulations using one or more sinewave dither tones at frequencies much lower than 1/T, e.g., at frequencies smaller than 1/(1000 T), as long as the effect of noise, drift, or dither is not so strong as to obscure (e.g., make substantially undetectable) the waveform periodicity.

In some embodiments, a light supply may also comprise control information. Control information may be used by other network elements of system 100, e.g., as described in the above-cited U.S. patent application Ser. No. 16/847,705. As used herein, the term "control information" refers to information imprinted by optical power supply module 130 onto one or more light supplies for the purpose of controlling, managing, and/or monitoring one or more network elements of system 100, and/or for facilitating various synchronization operations within one or more network elements of system 100. In some embodiments, control information may comprise one or more of: a clock frequency, a clock phase, a synchronization time stamp, a frame delimiter, a frame counter, status information, a heartbeat signal, and a command that may be used to control the behavior of other network elements, such as a master/slave assignment or a reset command.

For illustration purposes, only one such optical power supply module 103 is shown in FIG. 1. A person of ordinary skill in the art will understand that some embodiments may have more than one optical power supply module 103 appropriately distributed over system 100 and that such multiple optical power supply modules may be synchronized, e.g., using some of the techniques disclosed in the above-cited U.S. patent application Ser. No. 16/847,705.

Some end-to-end communication paths may pass through an optical power supply module 103 (e.g., see the communication path between nodes 101$_2$ and 101$_6$). For example, the communication path between nodes 101$_2$ and 101$_6$ may be jointly established by optical fiber links 102$_7$ and 102$_8$, whereby light supplied by optical power supply module 103 is multiplexed onto optical fiber links 102$_7$ and 102$_8$.

Some end-to-end communication paths may pass through one or more optical multiplexing units 104 (e.g., see the communication path between nodes 101$_2$ and 101$_6$). For example, the communication path between nodes 101$_2$ and 101$_6$ may be jointly established by optical fiber links 102$_{10}$ and 102$_{11}$. Multiplexing unit 104 is also connected, through link 1029, to receive light supplied by optical power supply module 103 and, as such, may be operated to multiplex said received light supply onto optical fiber links 102$_{10}$ and 102$_{11}$.

Some end-to-end communication paths may pass through one or more optical switching units 105 (e.g., see the communication path between nodes 101$_1$ and 101$_4$). For example, the communication path between nodes 101$_1$ and 101$_4$ may be jointly established by optical fiber links 102$_3$ and $102_{12}$, whereby light from optical fiber links $102_3$ and $102_4$ is either statically or dynamically directed to optical fiber link $102_{12}$.

As used herein, the term "network element" refers to any element that generates, modulates, processes, or receives light within system 100 for the purpose of communication. Example network elements include a node 101, an optical power supply module 103, an optical multiplexing unit 104, and an optical switching unit 105.

Some light supply distribution paths may pass through one or more network elements. For example, optical power supply module 103 may supply light to node $\mathbf{101}_4$ via optical fiber links $\mathbf{102}_7$, $\mathbf{102}_4$, and $\mathbf{102}_{12}$, letting the supply light pass through network elements $\mathbf{101}_2$ and 105.

Figure 2:
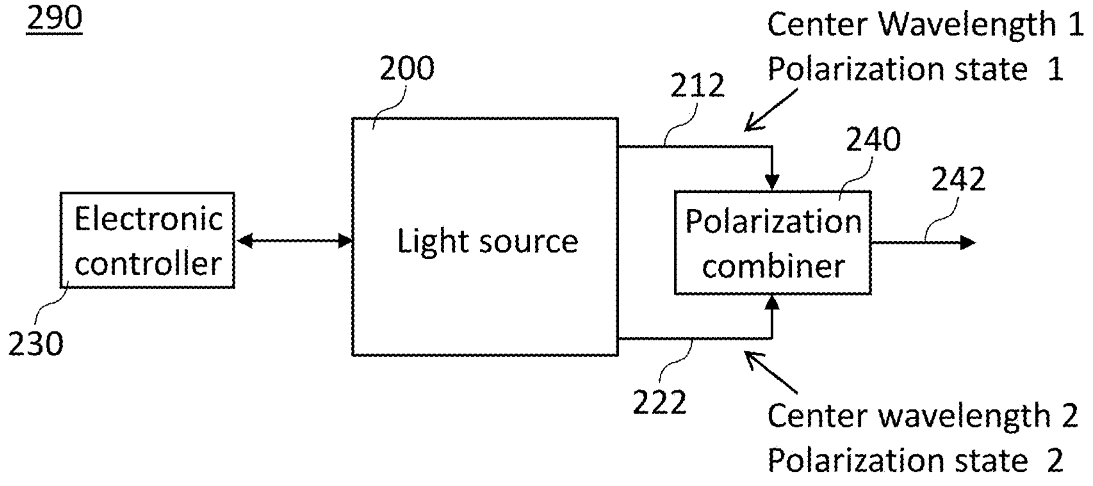
FIG. 2 shows a block diagram of an optical power supply module that can be used in the optical communication system of FIG. 1 according to an example embodiment.

FIG. 2 shows a block diagram of an optical power supply 290 that may be used as part of optical power supply module 103 to create a light supply for use in system 100 according to an example embodiment. Optical power supply 290 comprises: (i) a light source 200 possessing two light outputs 212 and 222, each in a single state of polarization; (ii) an electronic controller 230 configured to control light source 200 such as to establish time/frequency orthogonality between light output 212 and light output 222; and a polarization combiner 240 configured to multiplex light outputs 212 and 222 onto two orthogonal polarization states at its output 242.

Herein, a "polarization combiner" is an optical device having two input ports (e.g., connected to 212 and 222) and at least one output port (e.g. 242) and configured to multiplex light in a first polarization state at its first input port onto a first polarization state of light on one of its output ports, and light in a second polarization state at its second input port onto a second polarization state of light on the same output port, the second polarization state at output port 242 being approximately orthogonal to the first polarization state at output port 242. In some embodiments, the two orthogonal polarization states at output port 242 may be horizontally and vertically linearly polarized, respectively. In some other embodiments, the two orthogonal polarization states at output port 242 may be left-handed and right-handed circularly polarized, respectively. In some other embodiments, the two orthogonal polarization states at output port 242 may be relatively orthogonally, elliptically polarized states. In some embodiments, the polarization states at input ports 212 and 222 may be identical. In some other embodiments, the polarization states at input ports 212 and 222 may be orthogonal. In some embodiments, polarization combiner 240 may include polarization-sensitive optical elements, e.g., be implemented as a polarization beam combiner. In some other embodiments, polarization combiner 240 may not include any polarization-sensitive elements, e.g., be implemented as a polarization-maintaining optical power combiner or as a polarization-maintaining wavelength multiplexer.

Figure 7A:
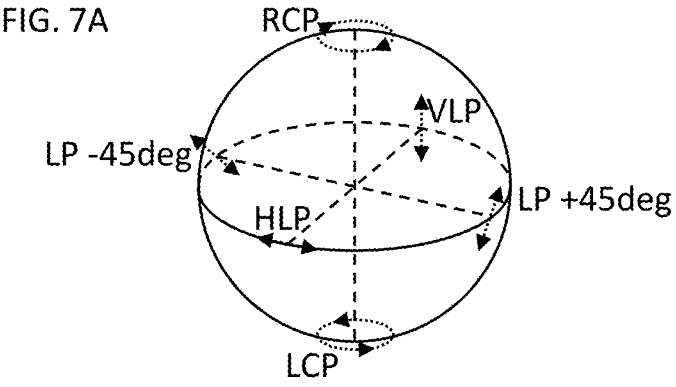
FIGS. 7A-7D graphically show some example use cases illustrating polarization-rotation independent optical-power splitting that may be implemented in the optical communication system of FIG. 1 according to some embodiments.

The concept of "polarization state" is graphically illustrated in FIG. 7A. For example, light in a linear polarization state may be represented by a complex electrical field vector $$\vec{E}(t) = E_0(t)\ \exp(j2\pi\ \text{ft})\ \vec{e}_x, \tag{1}$$

wherein the unit vector $\vec{e}_x$ may maintain its direction along a linear Cartesian axis (e.g., the x-axis as defined with respect to the fixed coordinate system of light source 200) to an accuracy of, e.g., within ±20 degrees over a relatively long duration, e.g., about one hour. In some embodiments, the unit vector $\vec{e}_x$ may maintain its direction along a linear Cartesian axis to within an accuracy of, e.g., ±20 degrees for the duration of typical normal operation of optical power supply 290. In the above expression, $E_0$ (t) is the constant or time-varying complex amplitude of the complex electrical field vector, f is the optical frequency, t denotes the time variable and $j=\sqrt{-1}$. In another example, a circular polarization state may be represented by a complex electrical field vector $$\vec{E}(t) = E_0(t)/\sqrt{2}\ \exp(j2\pi\ \text{ft})\ \left[\vec{e}_x + \exp(j\pi/2)\ \vec{e}_y\right], \tag{2}$$

wherein the unit vector $\vec{e}_y$ is orthogonal to $\vec{e}_x$ and both unit vectors maintain their directions along two orthogonal linear Cartesian axis to within an accuracy of, e.g., ±20 degrees over a relatively long duration of, e.g., about one hour. As used herein, the term "polarized light" denotes light in some well-defined polarization state.

As used herein, two optical fields are said to be "time/frequency orthogonal" if the degree of orthogonality n of the two optical fields' complex amplitudes $E_1(t)$ and $E_2(t)$, defined as $$\eta = 1 - \left|\int_t^{t+T} E_1(\tau)E_2^*(f)d\tau\right|^2 / \left(\int_t^{t+T} |E_1(\tau)|^2 d\tau \int_t^{t+T} |E_2(\tau)|^2 d\tau\right) \tag{3}$$

is close to 1, e.g., has a value between 0.8 and 1. Herein, the integration time interval [t, t+T] represents the time interval during which time/frequency orthogonality is to be determined. If at least one of the optical fields $E_1(t)$ and $E_2(t)$ has a non-periodic complex amplitude, the integration time interval is chosen to be long compared to a characteristic time duration within system 100, for example, duration T may be chosen to be at least 10 times a duration $T_S$ of a modulation symbol, at least 10 times a duration of an information packet, or at least 10 times a duration of an optical frame template. If both optical fields have periodic complex amplitudes $E_1(t)$ or $E_2(t)$ with period T, then the time duration T may be chosen as the duration over which the above integrals are being taken. In some embodiments, two fields may be called time/frequency orthogonal if η is greater than 0.8. In some embodiments two fields may be called time/frequency orthogonal if η is greater than 0.9. In some embodiments two fields may be called time/frequency orthogonal if η is greater than 0.99. The degree of orthogonality η may also be expressed in the frequency domain as $$\eta = 1 - \left|\int_{-\infty}^{\infty} E_1(f)E_2^*(f)df\right|^2 / \left(\int_{-\infty}^{\infty} |E_1(f)|^2 df \int_{-\infty}^{\infty} |E_2(f)|^2 df\right). \tag{4}$$

From the above two definitions (see Eqs. (3) and (4)), it may be seen that two optical fields are time-frequency orthogonal, e.g., if they are: (i) spectrally disjoint, i.e., if the spectral contents of the two fields are primarily located at mutually exclusive optical frequencies; and/or (ii) temporally disjoint, i.e., the complex amplitudes of the two optical fields differ from zero primarily at mutually exclusive times. In some embodiments, two optical fields may be time/frequency orthogonal if they overlap both in time and in frequency, provided that their degree of orthogonality is close to 1, e.g., as indicated by the example values/ranges of $\eta$ mentioned above.

In some embodiments, light source 200 produces light of different respective optical center frequencies for light outputs 212 and 222. As used herein, the term "optical center frequency" refers to the center of mass of the power spectral density of an optical field. In some embodiments, controller 230 may operate to control the optical frequency separation of light outputs 212 and 222 generated by light source 200, e.g., the difference between the two light sources' optical center frequencies.

In some embodiments, light source 200 may operate to generate two continuous-wave (CW) light outputs.

In some embodiments, light source 200 may be configured to let light outputs 212 and 222 comprise optical pulse trains of approximately (e.g., to within +1%) the same period $T_I$. In some embodiments, the shape of the optical pulses of the pulse train on light output 212 may differ from the shape of the optical pulses of the pulse train on light output 222. In some embodiments, the shape of the optical pulses of the pulse train on light output 212 may be approximately the same as the shape of the optical pulses of the pulse train on light output 222. In some embodiments, controller 230 may be configured to phase-lock said optical pulse trains with respect to one another. In some embodiments, controller 230 may be configured to synchronize said optical pulse trains such that the centers of the optical pulses on light output 212 are temporally aligned with the centers of the pulses on light output 222. As used herein, the term "center of a pulse" refers to a time corresponding to the center of mass of a pulse's intensity waveform. In some embodiments, controller 230 may be configured to synchronize said optical pulse trains such that the centers of the optical pulses on light output 212 are temporally offset from the centers of the pulses on light output 222 by a fixed amount $\Delta T$. In some embodiments, $\Delta T<Tr/2$. In some embodiments, $\Delta T<T_I/4$.

In some embodiments, controller 230 may invoke light outputs 212 and 222 to carry control information. Control information may be used by other network elements of system 100, e.g., as described in the above-cited U.S. patent application Ser. No. 16/847,705. As used herein, the term "control information" refers to information imprinted by optical power supply 290 onto one or both of light outputs 212 and 222 (e.g., equally or unequally) for the purpose of controlling, managing, and/or monitoring one or more network elements of system 100, and/or for facilitating various synchronization operations within one or more network elements of system 100. In some embodiments, control information may comprise one or more of: a clock frequency, a clock phase, a synchronization time stamp, a frame delimiter, a frame counter, status information, a heartbeat signal, and a command that may be used to control the behavior of other network elements, such as a master/slave assignment or a reset command. Different types of control information may be imprinted equally or unequally onto both light outputs 212 and 222 using different features thereof. For example, some types of control information may be imprinted using any suitable data modulation equally or unequally imprinted on both light outputs 212 and 222. In various embodiments, control information may be imprinted using an approximately equal change of intensity, phase, frequency, or polarization of light 212 and 222.

Figure 3A:
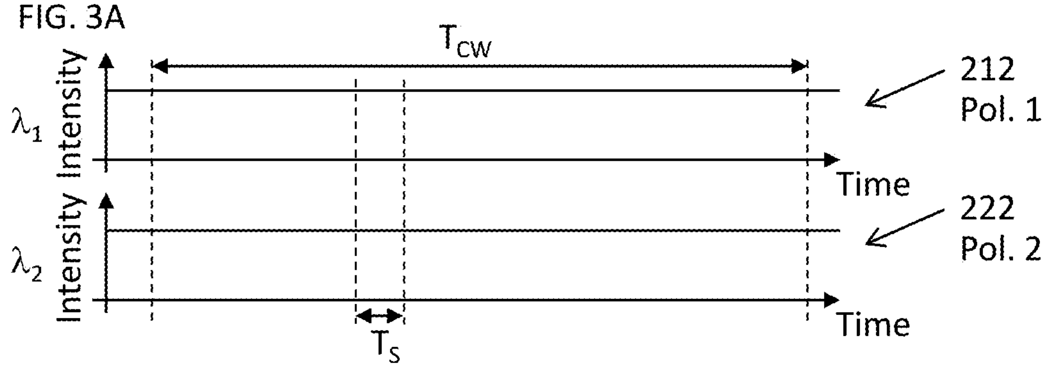
FIGS. 3A-3E illustrate some features of the light generated by an optical power supply in the optical communication system of FIG. 1 according to some embodiments.

FIGS. 3A-3E illustrate various features of light outputs 212 and 222 of optical power supply 290 according to some embodiments. FIG. 3A illustrates intensity-versus-time plots of some embodiments of light outputs 212 and 222. In these particular embodiments, light outputs 212 and 222 may be CW at different optical frequencies $f_1=c/\lambda_1$ and $f_2=c/\lambda_2$, respectively, where $\lambda_1$ and $\lambda_2$ are the wavelengths associated with optical frequencies $f_1$ and $f_2$ and c is the speed of light in the medium in which the wavelengths are being measured.

Figure 3B:
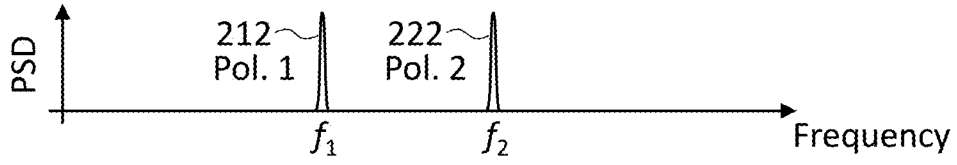

FIG. 3B illustrates the optical power-spectral densities (PSDs) of light outputs 212 and 222. In some embodiments, the optical frequency difference $\Delta f=|f_1-f_2|$ between light output 212 and light output 222 may be significantly larger than the symbol rate $R_S$ used for communication by a transmitter of node 101 that receives light for modulation from optical power supply 290, i.e., $\Delta f>>R_S$. In some embodiments, $\Delta f>2\ R_S$. In some other embodiments, $\Delta f>5\ R_S$. In some other embodiments, the frequency difference $\Delta f$ may be chosen to be approximately (e.g., to within ±10%) an integer multiple of $R_S$, i.e., $\Delta f\approx n\ R_S$, with n=1, 2, 3, . . . . In some embodiments, $\Delta f\approx R_S$. In some embodiments, $\Delta f\approx 2\ R_S$.

Figure 3C:
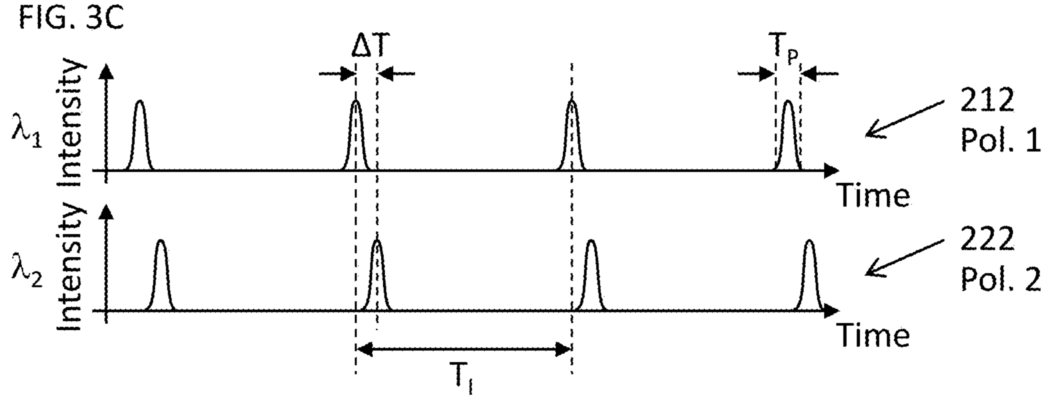

FIG. 3C shows intensity-versus-time plots of light outputs 212 and 222 for some example embodiments. In these embodiments, light outputs 212 and 222 may, each on a different respective optical center frequency $f_1\neq f_2$, carry an optical pulse train of period Ty and pulse duration $T_P$. In some embodiments, $T_P$ may be defined as the full-width-at-half height of a pulse's optical intensity waveform. In other embodiments, $T_P$ may be defined as the reciprocal of the 3-dB bandwidth of the optical pulse spectrum. In some embodiments, $T_P$ may be approximately equal to one half of the pulse train period $T_I$, i.e., $T_P\approx Tr/2$. In some embodiments, the pulse train of light output 212 may be temporally offset by an amount of time $\Delta T$ relative to the pulse train of light output 222. In some embodiments, the temporal offset $\Delta T$ may be larger than 1.5 times the full-width-at-half-height of the pulses constituting the pulse trains. In some other embodiments, the temporal offset $\Delta T$ may be larger than 2 times the full-width-at-half-height of the pulses constituting the pulse trains. In some embodiments, the temporal offset may be significantly smaller than $T_I/2$. In some embodiments, the two pulse trains may be temporally aligned, i.e., $\Delta T\approx 0$. In some embodiments, temporal alignment may imply $\Delta T<T_P/10$. In some embodiments, temporal alignment may imply $\Delta T<T_P/100$. In some embodiments, temporal alignment may imply $\Delta T<T_I/10$. In some embodiments, temporal alignment may imply $\Delta T<T_I/100$.

Figure 3D:
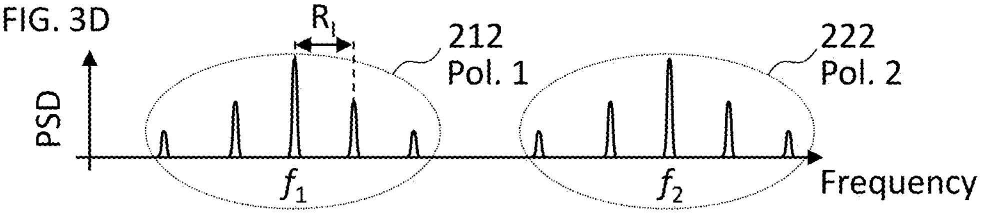
Figure 3E:
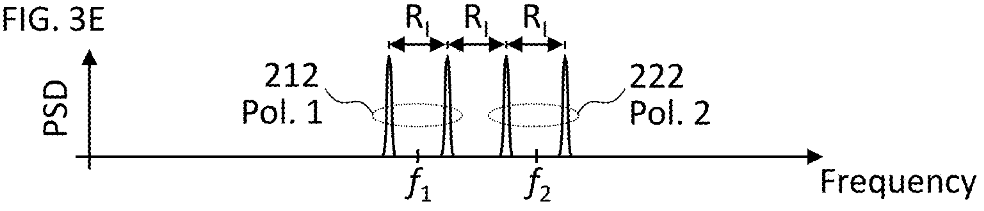

FIGS. 3D and 3E illustrate optical spectra of light outputs 212 and 222 according to some example embodiments. In some embodiments, the frequency separation $\Delta f=|f_1-f_2|$ may be significantly larger than the pulse repetition rate $R_I=1/T_I$, i.e., $\Delta f>>R_I$. In some other embodiments, $\Delta f>5\ R_I$. In some other embodiments, the frequency difference $\Delta f$ may be chosen to be approximately (e.g., to within +10%) an integer multiple of $R_I$, i.e., $\Delta f\approx n\ R_I$, with n=2, 3, 4, . . . . In some embodiments, $\Delta f=2\ R_I$. In some embodiments, $\Delta f\approx 3\ R_I$. In some embodiments, visualized in FIG. 3E, the complex amplitude of light output 212 and light output 222 may each have a sinusoidal time dependence of period $R_I/2$, i.e., the spectra of light output 212 and light output 222 each comprise two tones spaced by $R_I$. The resulting temporal intensity waveforms are therefore proportional to $\sin^2(\pi R_I t)$ for the corresponding pulse trains at light outputs 212 and 222. In various embodiments, the center frequencies of light outputs 212 and 222 may be spaced by 2 $R_r$, i.e., the four tones jointly making up light outputs 212 and 222 are all spaced by $R_r$. In various embodiments, the optical phase difference between spectrally adjacent tones is constant, e.g., the phase difference between the tone at frequency $f_1-R_r/2$ and the tone at frequency $f_1+Ry/2$ is the same as the phase difference between the tone at frequency $f_2-R_r/2$ and the tone at frequency $f_2+R_r/2$. Such a constant phase progression may ensure that the temporal skew between pulse trains at light outputs 212 and 222 is approximately zero, e.g., ΔT=0. In some embodiments, the tone at frequency $f_1+R_r/2$ and the tone at frequency $f_2-R_r/2$ may also have the same as the phase difference as the phase difference between the tone at frequency $f_1-R_r/2$ and the tone at frequency $f_1+Ry/2$.

FIGS. 4A-4F illustrate various embodiments of optical power supply 290. Various embodiments corresponding to FIGS. 4A-4C implement some of the schemes described above in reference to FIGS. 3A-3B. In the example embodiment shown in FIG. 4A, two CW laser sources 410 and 420 operate to emit polarized light (i.e., light in respective specific polarization states) at different respective wavelengths λ1 and λ2 that may be optically amplified using polarization-maintaining optical amplifiers 413 and 423. The two sources of CW light may be polarization-combined using optical polarization combiner 440, configured to combine polarized light on its two input ports 412 and 422 onto two orthogonal polarization states at its output port 441. Spectral characteristics of optical polarization combiner 440 are such that light of both wavelengths A and 22 can be passed through with little attenuation. In some embodiments, polarization combiner 440 may be a polarization beam combiner. In some other embodiments, polarization combiner 440 may be a polarization-maintaining optical power combiner. In yet some other embodiments, polarization combiner 440 may be a polarization-maintaining wavelength multiplexer. Polarization combiner 440 may be followed by a polarization-independent optical amplifier 443. Lasers 410 and 420 may be wavelength-controlled by a wavelength controller 430.

Figure 4A:
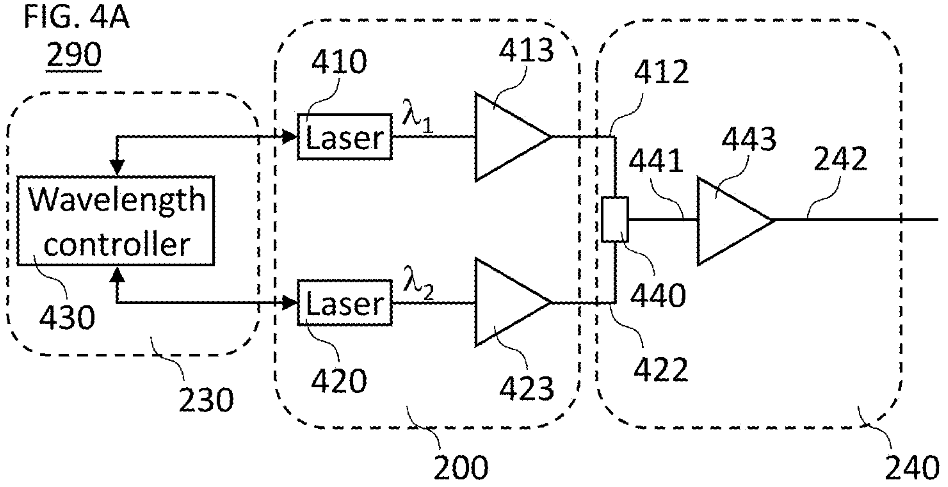
FIGS. 4A-4F illustrate optical power supplies, one or more of which may be used in the optical communication system of FIG. 1 according to some embodiments.
Figure 4B:
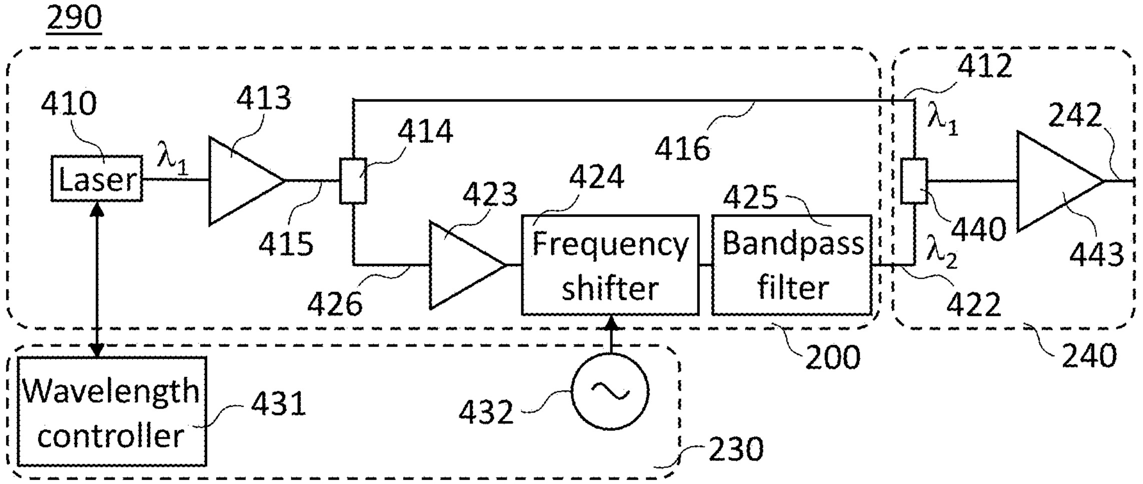

In the embodiment of optical power supply 290 shown in FIG. 4B, CW laser source 410 at wavelength Mu may be free-running or may be wavelength-locked by a wavelength controller 431 and configured to emit polarized light. Light generated by laser source 410 may be amplified by polarization-maintaining optical amplifier 413 before being split by an optical splitter 414. In some embodiments, optical splitter 414 may be a polarization-maintaining optical power splitter. In some other embodiments, optical splitter 414 may be a polarization beam splitter configured to split polarized light incident on its input 415 into two orthogonally polarized parts at its two outputs 416 and 426. In some embodiments, optical splitter 414 may be a linear polarization splitter oriented at 45 degrees relative to the linear polarization state of the incident laser light on its input 415. A portion 416 of the split light at wavelength λ may be passed directly to combiner 440, while a portion 426 of the split light may be frequency-shifted using an optical frequency shifter 424, driven by, e.g., a sinusoidal electrical reference signal 432. In some embodiments, frequency shifter 424 includes one of: an acousto-optic modulator, a single-sideband modulator, and a Mach-Zehnder modulator. In some embodiments, frequency shifter 424 may be followed by an optional optical bandpass filter 425 that may pass only one of the several tones that may be generated by the upstream frequency shifter 424. An additional optical amplifier 423 may be used to compensate for optical losses. Frequency-shifted light at port 422 may be polarization-combined with frequency un-shifted light at port 412 in combiner 440.

Figure 4C:
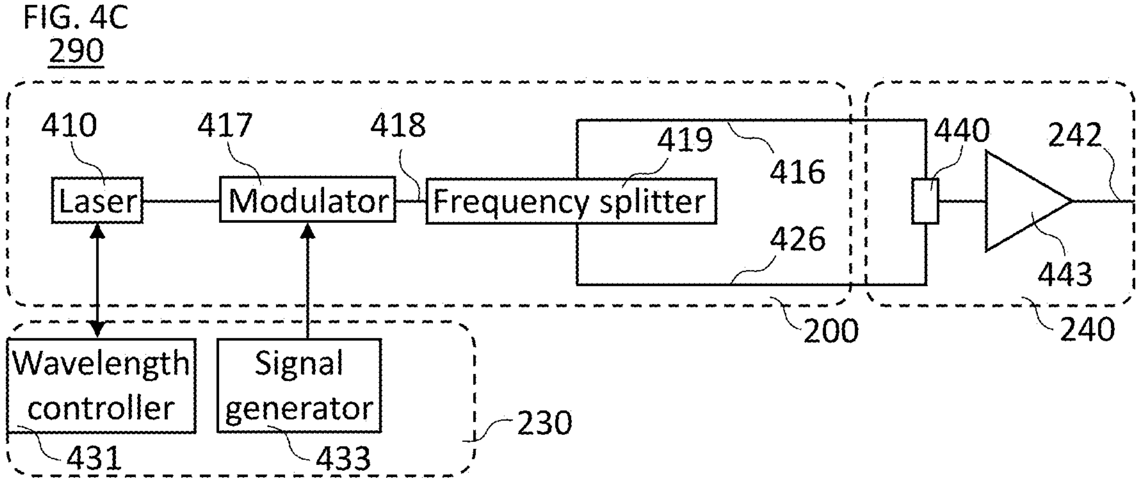

In the embodiment of optical power supply 290 shown in FIG. 4C, CW laser source 410 may be free-running or wavelength-controlled by wavelength controller 431. The output of laser source 410 may be modulated by an optical modulator 417 driven by an electrical signal generator 433. Modulator 417 may be configured to split a CW optical field at its input into two spectral tones at its output. For example, modulator 417 may be a Mach-Zehnder modulator biased at its transmission null and driven by a sinusoidal electrical signal whose amplitude is substantially smaller than the modulator's half-wave voltage and whose period is T. This mode of operation is known to suppress the incoming CW tone at optical frequency $f_0$ and to produce two spectral tones at $f_{1,2}=f_0+T$ at the modulator output. The two tones constituting an optical field 418 may be frequency-split by an optical frequency splitter 419 into portions 416 and 426. In some embodiments, optical frequency splitter 419 may be implemented using an optical (de) interleaver. Portions 416 and 426 may then be polarization-orthogonally combined using combiner 440. In some embodiments, modulator 417 may further be configured to imprint control information on optical field 418. For example, modulator 417 may be configured to periodically extinguish light of optical field 418 for a brief amount of time. In some embodiments, modulator 417 may be configured to extinguish light of optical field 418 for a duration of 2 $T_S$ once per period of duration 1000 $T_S$. In some embodiments, modulator 417 may be configured to modulate a time stamp onto light 418 for a duration of 10 $T_S$ once per period of duration 10000 $T_S$.

Figure 4D:
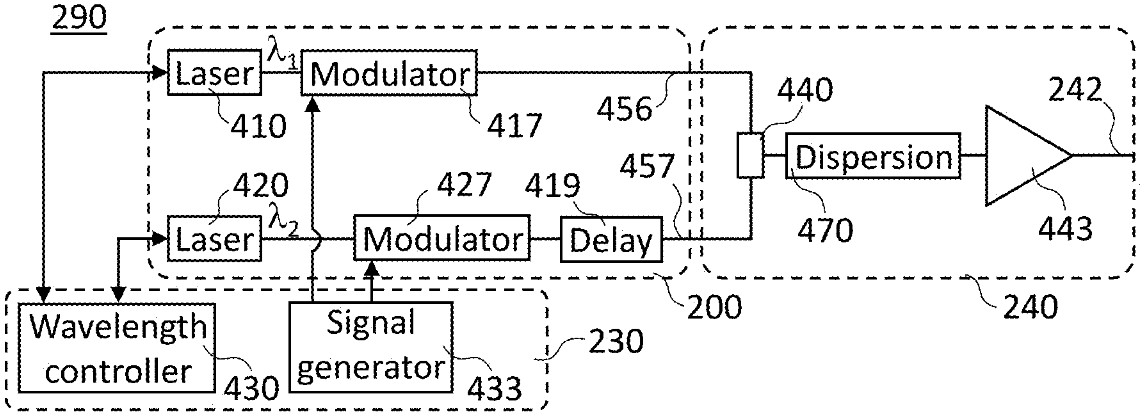
Figure 4E:
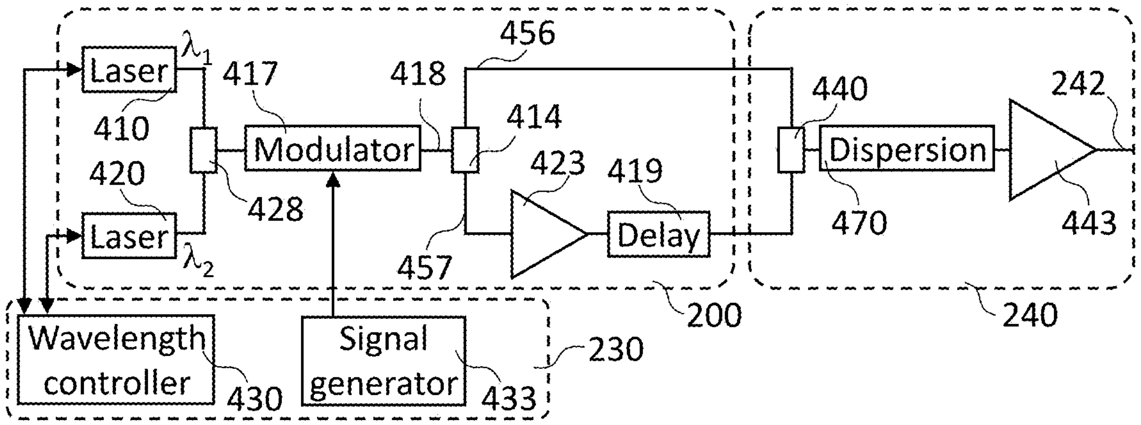
Figure 4F:
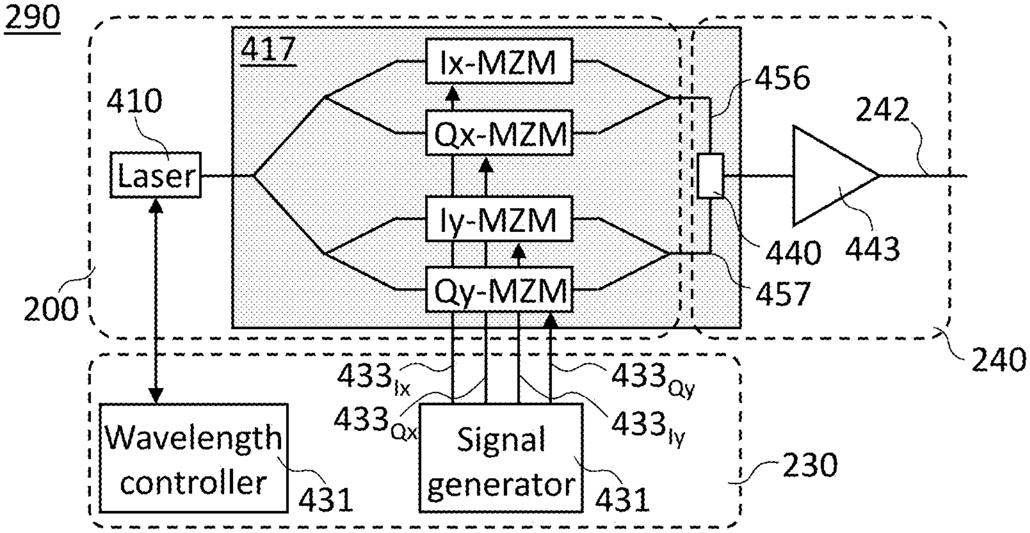

Various embodiments shown in FIGS. 4D-4F implement some of the schemes described above in reference to FIGS. 3C-3E. In the embodiment of optical power supply 290 shown in FIG. 4D, two laser sources 410 and 420 may emit polarized light at different wavelengths $\lambda_1$ and $\lambda_2$. In some embodiments, wavelengths λ1 and λ2 and/or their difference may be controlled by wavelength controller 430. In some embodiments, lasers 410 and 420 may emit CW light. In some other embodiments, light emitted by one or both of lasers 410 and 420 may comprise an optical pulse train. In some embodiments, light emitted by lasers 410 and 420 may be modulated using optical modulators 417 and 427, driven by respective electrical signals generated by signal generator 433. In some embodiments, laser 410 and modulator 417, as well as laser 420 and modulator 427, together with signal generator 433, may be configured such that modulated optical fields 456 and 457 each comprise an optical pulse train with period $T_r$. In various embodiments, modulators 417 and 427 may be electro-absorption modulators, ring modulators, Mach-Zehnder modulators, or in-phase/quadrature (IQ) modulators. In some embodiments, modulators 417 and 427 and signal generator 433 may be configured to generate optical fields 456 and 457 that are periodically modulated in both amplitude and phase, including chirped and arbitrarily pre-distorted optical fields, e.g., dispersion pre-distorted optical fields. In some embodiments, the functionalities of light generation and modulation provided by laser 410 and modulators 417 as well as by laser 420 and modulators 427 may each be implemented using a single direct-modulated laser or a mode-locked laser. In some embodiments, the output of modulator 427 may be delayed by an optical delay element 419. In some embodiments, delay element 419 may be implemented using a length of optical fiber. In some other embodiments, delay element 419 may be a lumped free-space optical delay element. In some embodiments, the delay ΔT imposed by delay element 419 onto optical pulse train 457 relative to optical pulse train 456 may be less than half the period of the optical pulse train, i.e., $\Delta T<T_I/2$. In some other embodiments, the delay imposed by delay element 419 onto optical pulse train 457 relative to optical pulse train 456 may be less than half the period of the optical pulse train modulo an integer multiple of $T_I$, i.e., $\Delta T+k\ T_I$, with k=+1, +2, +3, In some embodiments, individual pulses of optical pulse trains 456 and 457 may have substantially similar intensity waveforms. In some other embodiments, individual pulses of optical pulse trains 456 and 457 may have different intensity waveforms. Optical pulse trains 456 and 457 may be polarization-combined using combiner 440, configured to combine light on its two input ports onto orthogonal polarizations at its output port. In some embodiments, a chromatic-dispersion-compensating optical element 470 may pre-disperse polarization-multiplexed optical pulse trains. In some embodiments, chromatic-dispersion-compensating optical element 470 may be a grating-based or an etalon-based optical dispersion compensator. In some other embodiments, chromatic-dispersion-compensating optical element 470 may be implemented using a length of dispersion-compensating optical fiber. In some embodiments, modulators 417 and 427 may further be configured to imprint control information on optical pulse trains 456 and 457. For example, modulators 417 and 427 may be configured to periodically extinguish light 456 and 457 for a brief amount of time. In some embodiments, modulators 417 and 427 may be configured to extinguish light 456 and 457 for a duration of 2 $T_S$ once per period of duration 1000 $T_S$. In some embodiments, modulators 417 and 427 may be configured to modulate a time stamp onto light 456 and 457 for a duration of 10 $T_S$ once per period of duration 10000 $T_S$.

In the embodiment of optical power supply 290 shown in FIG. 4E, two laser sources 410 and 420 may emit polarized light at different respective wavelengths $\lambda_1$ and $\lambda_2$. In some embodiments, wavelengths $\lambda_1$ and $\lambda_2$ and/or their difference may be controlled by wavelength controller 430. Light generated by laser 410 and laser 420 may be combined by a polarization-maintaining optical combiner 428. In some embodiments, polarization-maintaining optical combiner 428 may be a polarization-maintaining optical power combiner. In some embodiments, polarization-maintaining optical combiner 428 may be a polarization-maintaining optical wavelength multiplexer. Combined light may be modulated by optical modulator 417 driven by electrical signal generator 433 to generate at each of wavelengths $\lambda_1$ and $\lambda_2$ an optical pulse train at modulator output 418. The light outputted by modulator 417 may be split into two portions 456 and 457 using splitter 414. In some embodiments, portion 456 may be passed directly to combiner 440 while portion 457 of may be optically delayed by delay element 419. Optionally relatively delayed portions 456 and 457 may be polarization-combined using combiner 440, configured to combine light on its two input ports onto orthogonal polarizations at its output port. In some embodiments, chromatic-dispersion-compensating optical element 470 may pre-disperse polarization-multiplexed optical pulse trains. In some embodiments, modulator 417 may further be configured to imprint control information on light output 418. For example, modulator 417 may be configured to periodically extinguish light 418 for a brief amount of time. In some embodiments, modulator 417 may be configured to extinguish light 418 for a duration of 2 $T_S$ once per period of duration 1000 $T_S$. In some embodiments, modulator 417 may be configured to modulate a time stamp onto light 418 for a duration of 10 $T_S$ once per period of duration 10000 $T_S$.

In the embodiment of optical power supply 290 shown in FIG. 4F, CW laser source 410 may be free-running or wavelength-controlled by wavelength controller 431. The output of laser source 410 may be modulated by optical modulator 417 driven by electrical signal generator 433. Modulator 417 may be a polarization-diversity in-phase/quadrature (IQ) modulator (PDM-IQM), comprising a total of four Mach-Zehnder modulators (labeled Ix-MZM, Qx-MZM, Iy-MZM, and Qy-MZM, FIG. 4F) in a nested configuration, with the "Q" paths having built-in an optical phase shift of 90 degrees relative to the "I" paths. PDM-IQM 417 and signal generator 433 may be configured to produce the spectrum shown in FIG. 3E, e.g., as follows: Signals $\mathbf{433}_{Ix}$, $\mathbf{433}_{Qx}$, $\mathbf{433}_{Iy}$, and $\mathbf{433}_{Qy}$ are configured to be electrical signals with a voltage swing that is not significantly larger than the half-wave voltage of each Mach-Zehnder modulator, and with a temporal dependence of, respectively, $\cos(\pi R_I t)+\cos(3\pi\ R_I t)$, $-\sin(\pi\ R_I t)-\sin(3\pi\ R_I t)$, $\cos(\pi\ R_I t)+\cos(3\pi\ R_I t)$, and $\sin(\pi\ R_I t)+\sin(3\pi\ R_I t)$. In some embodiments, electrical signals $\mathbf{433}_{Ix}$, $\mathbf{433}_{Qx}$, $\mathbf{433}_{Iy}$, and $\mathbf{433}_{Qy}$ may be generated using digital-to-analog converters (not explicitly shown in FIG. 4F). In some embodiments, modulator 417 may further be configured to imprint control information on light 456 and 457. For example, modulator 417 may be configured to periodically extinguish light 456 and 457 for a brief amount of time. In some embodiments, modulator 417 may be configured to extinguish light 456 and 457 for a duration of 2 $T_S$ once per period of duration 1000 $T_S$. In some embodiments, modulator 417 may be configured to modulate a time stamp onto light 456 and 457 for a duration of 10 $T_S$ once per period of duration 10000 $T_S$.

Figure 5:
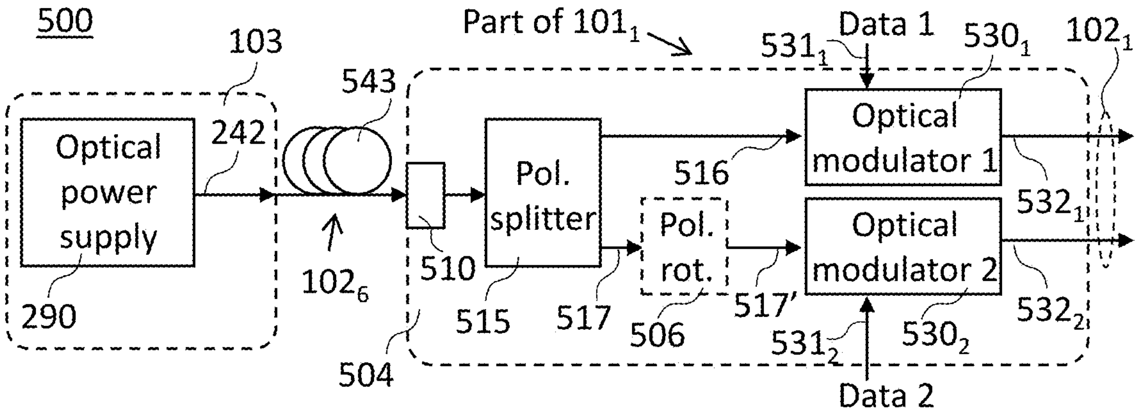
FIG. 5 shows a block diagram of an example distributed optical transmitter of the optical communication system of FIG. 1 employing an optical power supply module of FIG. 2 according to an embodiment.

FIG. 5 shows a block diagram of a distributed optical transmitter 500 that can be used in optical communication system 100 of FIG. 1 according to an embodiment. Transmitter 500 comprises optical power supply 290 and a transmit module 504. As indicated in FIG. 5, optical power supply 290 may be a part of optical power supply module 103. In operation, optical power supply 290 may generate a light supply on output 242, e.g., as described in reference to one or more of FIGS. 3A-3E. Output 242 of optical power supply 290 is optically coupled to transmit module 504 by way of an optical fiber 543, which can be a part of, e.g., fiber link $\mathbf{102}_6$. In different embodiments, transmit module 504 may be a part of different network elements of system 100. For illustration purposes and without any implied limitation, transmit module 504 is described herein in reference to an embodiment in which said transmit element is a part of node $\mathbf{101}_1$.

In some embodiments, optical fiber 543 may include one or more sections of non-polarization-maintaining optical fiber. In such embodiments, light supplied by optical power supply module 103 to node $\mathbf{101}_1$ may experience random polarization rotation upon propagation through optical fiber 543. Owing to this random polarization rotation, light supplied by optical fiber 543 may arrive at node $\mathbf{101}_1$ such that the two polarized components of light output 242 are in two random, but relatively orthogonal states of polarization when entering transmit module 504 via an optical interface 510 thereof. The relative orthogonality may be maintained, e.g., because both of the two polarized components of light output 242 are subjected to substantially the same (albeit random) polarization rotations in the one or more sections of non-polarization-maintaining optical fiber.

In some embodiments, optical interface 510 may comprise one or more optical connectors, one or more edge-coupling mechanisms to a photonic integrated circuit (PIC), one or more vertical coupling mechanisms to a PIC, etc.

Optical interface 510 is connected to an optical polarization splitter 515. In some embodiments, the polarization splitting function of optical polarization splitter 515 may be integrated into optical interface 510. For example, in some embodiments, a polarization-diversity vertical grating coupler may be configured to simultaneously act as a polarization splitter 515 and as a part of optical interface 510. In some other embodiments, an optical connector comprising a polarization-diversity arrangement may simultaneously act as an optical interface 510 and as a polarization splitter 515.

Owing to the polarization-multiplexed nature as well as the time/frequency orthogonality of the light generated by optical power supply 290 on output 242, any arbitrary polarization rotation within fiber link $\mathbf{102}_6$ results in a substantially equal optical power split between output ports 516 and 517 of optical polarization splitter 515 (e.g., see a detailed description of FIGS. 7A-7D below). Therefore, light on ports 516 and 517 can be used as a relatively stable optical power supply for optical modulation within transmit module 504, which is independent of random polarization rotations that might be occurring within link $\mathbf{102}_6$.

Optical modulators $\mathbf{530}_1$ and $\mathbf{530}_2$ receive supply light on respective polarization splitter outputs 516 and 517 and modulate data onto said light using one or more electrical drive signals $\mathbf{531}_1$ and $\mathbf{531}_2$, thereby producing respective modulated optical signals on modulator outputs $\mathbf{532}_1$ and $\mathbf{531}_2$, respectively. In various embodiments, modulation may be done in any one or more of intensity, phase, polarization, and frequency. In some embodiments, modulation may be done at a modulation symbol rate $1/T_I$. In some embodiments, a polarization rotator 506 may be employed to convert orthogonal output polarization states at polarization splitter outputs 516 and 517 to equal polarization states on ports 516 and 517' for subsequent modulation. For example, polarization splitter 515 may split light incident on its input port into transversal-magnetic (TM) and transversal-electric (TE) polarizations at its two outputs 516 and 517, respectively. If modulators 530 are both designed for modulating TE-polarized light, then polarization rotator 506 may be used to rotate TM-polarized light on port 517 to TE-polarized light on port 517'. In some embodiments, polarization rotator 506 may be a part of polarization splitter 515.

Modulated light on modulator output ports $\mathbf{532}_1$ and $\mathbf{532}_2$ may be passed to different respective fibers of link $\mathbf{102}_1$ for communication of information to another node of system 100, which in the example case shown in FIG. 5 is node $\mathbf{101}_2$. Some example signals that may be used and/or generated in transmitter 500 are described below in reference to FIG. 8.

Figure 6:
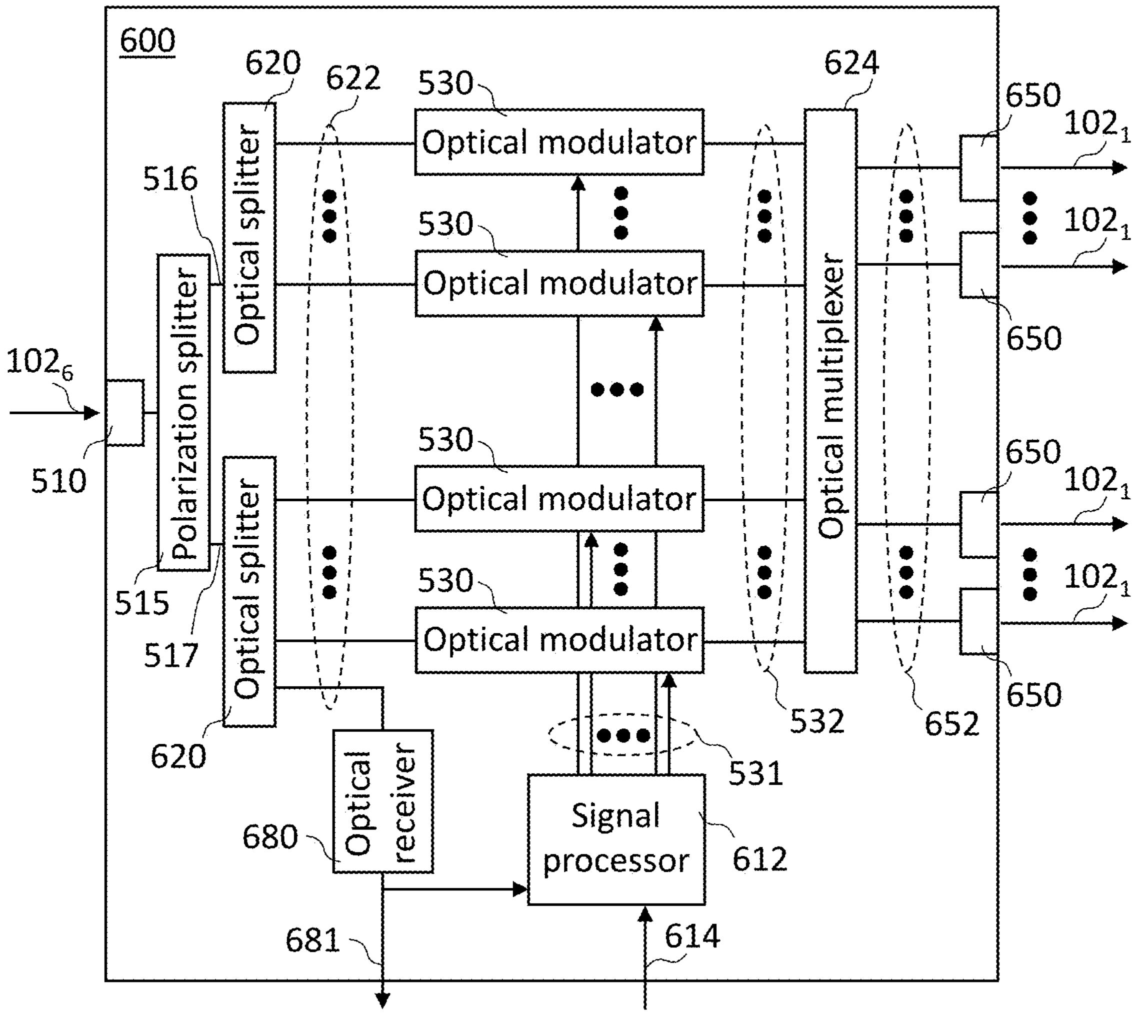
FIG. 6 shows a block diagram of an optical transmitter that can be used in the optical communication system of FIG. 1 according to an embodiment.

FIG. 6 shows a block diagram of an optical transmit module 600 that can be used in system 100 according to an embodiment. Transmit module 600 can be implemented using some of the same elements as transmit module 504, e.g., as indicated by the corresponding matching reference numerals in FIGS. 5 and 6. In different embodiments, transmit module 600 may be a part of different network elements of system 100. For illustration purposes and without any implied limitation, transmit module 600 is described below in reference to an embodiment in which said transmit module is a part of node $\mathbf{101}_1$.

In operation, transmit module 600 may receive light from optical port 242 of optical power supply 290 contained within optical power supply module 103 via optical interface 510 and optical link $\mathbf{102}_6$ (also see FIGS. 1 and 5). Optical interface 510 is connected to optical polarization splitter 515. In some embodiments, the polarization splitting function of optical polarization splitter 515 may be integrated into optical interface 510. In some embodiments, optical polarization splitter 515 may further be connected to one or more (e.g., cascaded) optical splitters 620, only two of which are shown in FIG. 6 for illustration purposes. In various embodiments, an optical splitter 620 may be constructed, e.g., as known in the pertinent art, using one or more of: optical power splitters, wavelength splitters, and spatial-distribution splitters, such as spatial-mode splitters or multi-core-fiber fanouts.

Optical modulators 530 of transmit module 600 receive light on respective optical-splitter outputs 622 and modulate data onto said light using one or more electrical drive signals 531, thereby producing respective modulated optical signals on modulator outputs 532. In various embodiments, modulation may be done in any one or more of intensity, phase, polarization, and frequency. In some embodiments, modulation may be done at a modulation symbol rate $R_S=R_I=1/T_I$.

In some embodiments, one or more modulators 530 may at times not modulate information onto light of outputs 622. Alternatively or in addition, one or more of the shown modulators 530 may be omitted from (i.e., not present in) the structure of transmit module 600. In such cases, light of the corresponding output(s) 622 may be passed through transmit module 600 on to other network elements of system 100, e.g., in accordance with the above-provided functional description of certain aspects of system 100 (FIG. 1). In some embodiments, some of such passed-on light 622 may be used by other network elements of system 100 as an optical power supply. In some embodiments, some of such passed-on light 622 may be received by other network elements of system 100 to extract control information therefrom.

In some embodiments, some modulators 530 of transmit module 600 may be configured to use more than one electrical drive signal 531 to modulate light received from the corresponding output 622. Examples of such modulators 530 include but are not limited to in-phase/quadrature (IQ) modulators and segmented-electrode modulators. In various embodiments, opto-electronic modulators 530 may comprise electro-absorption modulators, ring modulators, or Mach-Zehnder modulators. In various embodiments, opto-electronic modulators 530 may be made of semiconductor materials, materials used in Silicon Photonics, polymer materials, or Lithium Niobate. In some embodiments, opto-electronic modulators 530 may at least partially be integrated in one or more PICS (not explicitly shown in FIG. 6). In various embodiments, electrical drive signals 531 may be binary or multilevel. In some embodiments, electrical drive signals 531 may be suitably pulse-shaped or may be predistorted using digital or analog filters, or may be electrically amplified using electrical driver amplifiers.

In some embodiments, some of the light on optical splitter outputs 622 may be detected using one or more optical receivers 680 to extract information contained therein. Such information may include, without limitation, one or more frequency components, one or more time skew or clock phase values, and one or more pieces of control information embedded within the supply light generated by optical power supply module 103.

In some embodiments, information extracted by optical receivers 680 may be provided to devices external to transmit module 600 on an output port 681 thereof for further use within system 100, such as for network traffic synchronization/arbitration/scheduling, database time-stamping, local clock synchronization, etc. In some embodiments, information extracted by optical receiver(s) 680 may be fed into an electronic signal processor 612. In some embodiments, electronic signal processor 612 may receive one or more electrical signals 614 and may pre-process those electrical signals to generate electrical drive signals 531 for modulators 530. In some embodiments, pre-processing may comprise any form of analog, digital, or mixed-signal manipulation, including but not limited to retiming, de-skewing, buffering, bit stuffing, bit removal, forward error correction coding, line coding, framing, insertion of pilots and packet headers, time-stamping, linear and nonlinear pre-compensation, pre-equalization, pre-emphasis, and pre-distortion.

In some embodiments, modulated light on modulator outputs 532 may be multiplexed in wavelength, polarization, or spatial distribution of the optical field using one or more multiplexers 624 to generate one or more optical multiplexed signals 652. Multiplexed signals 652 may then be transmitted via one or more output interfaces 650 to one or more optical fibers $\mathbf{102}_1$. In some embodiments, output interfaces 650 may be implemented, e.g., as one or more optical fiber connectors, one or more edge couplers from PIC to fibers, or one or more vertical couplers from PIC to fibers. In some embodiments, certain multiplexing functions of multiplexer 624 may be integrated into certain output interfaces 650. For example, in some embodiments, a polarization-diversity vertical grating coupler may simultaneously act as a polarization multiplexer of multiplexer 624 and as a part of an output interface 650. In some other embodiments, an optical connector comprising a polarization-diversity arrangement may simultaneously act as an output interface 650 and as a polarization multiplexer 624.

In some embodiments, each modulator output 532 may be passed directly to a corresponding optical fiber or to a corresponding optical fiber core of fiber link $\mathbf{102}_1$ via a corresponding output interface 650, i.e., without undergoing any multiplexing therebetween. In other words, multiplexer 624 or some parts thereof may not be present in some embodiments.

FIGS. 7A-7D graphically show some example use cases, e.g., illustrating the polarization-rotation independent optical power splitting within transmit modules 504 and 600, that may be implemented based on embodiments of optical power supply 290 within optical power supply module 103.

FIG. 7A shows a Poincare sphere, conventionally used to visualize polarization states of light. Mutually orthogonal polarization states are found at diametrically opposed locations on the sphere. For example, linear polarization states are found on the equator of the sphere, with one orthogonal pair including horizontal linear polarization (HLP) and vertical linear polarization (VLP), and another orthogonal pair including ±45-degree (LP±45-deg) linear polarizations being indicated in FIG. 7A. The orthogonal pair of right-circular polarization (RCP) and left-circular polarization (LCP) is found on the two poles of the Poincare sphere, as is also indicated in FIG. 7A.

Figure 7B:
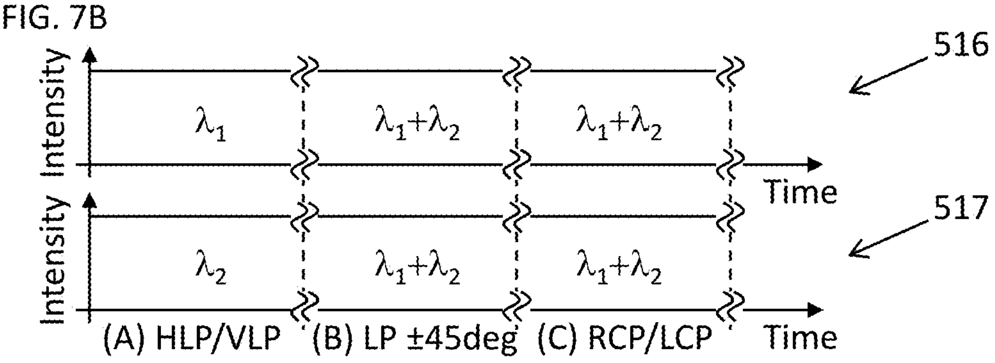

FIG. 7B shows intensity-versus-time plots of the light at the two output ports 516 and 517 of polarization splitter 515 (also see FIGS. 5 and 6) for an example case, wherein optical power supply 103 transmits CW wavelength A in HLP and CW wavelength $\lambda_2$ in VLP (also see FIGS. 3A-3B). Time intervals (A), (B), and (C), which are neither implied to occur in the shown temporal succession nor to be characterized by sharp transitions therebetween, correspond to three different example instantiations of random polarization rotations, wherein: during time interval (A), fiber link $\mathbf{102}_6$ does not rotate the polarization; during time interval (B), fiber link $\mathbf{102}_6$ rotates the polarizations to the LP±45-deg states; and during time interval (C), fiber link $\mathbf{102}_6$ rotates the polarizations to the RCP/LCP states. As optical power supply 290 is configured to transmit two time/frequency-orthogonal optical fields in two orthogonal polarization states, the light intensities at output ports 516 and 517 of polarization splitter 515 will be approximately constant, irrespective of random polarization rotations at the polarization splitter input.

For the time interval (A), polarization splitter 515 operates to: (i) direct light of wavelength $\lambda_1$ substantially exclusively to output port 516; and (ii) direct light of wavelength $\lambda_2$ substantially exclusively to output port 517. For the time interval (B), polarization splitter 515 operates to cause each of output ports 516 and 517 to have an approximately equal amount of light at wavelength $\lambda_1$ and at wavelength $\lambda_2$. Likewise, for the time interval (C), polarization splitter 515 operates to cause each of output ports 516 and 517 to have an approximately equal amount of light at wavelength $\lambda_1$ and at wavelength $\lambda_2$. Not shown in FIG. 7B, for time intervals (B) and (C), are possible beat frequency oscillations at the difference frequency $\Delta f=|f_1-f_2|$ between the two CW tones at wavelengths $\lambda_1$ and $\lambda_2$. However, as long as $\Delta f$ is chosen sufficiently large compared to the symbol rate $R_S$, these oscillations may average out within each modulation symbol of transmitter 500 and, as such, may not significantly affect the performance. Choosing $\Delta f$ smaller than $R_S$ may result in slow fading of the light output at each individual port 516 and 517. More specifically, light incident at polarization splitter 515 may periodically transition between appearing entirely on output port 516 (with no light appearing on output port 517) and appearing entirely on output port 517 (with no light appearing on output port 516). This periodic transition of light between ports 516 and 517 may occur at a period $\Delta f$, and if $\Delta f$ is significantly smaller than $R_S$ may lead to some modulation time slots on each polarization splitter output port receiving no or insufficient light to modulate information onto. Choosing $\Delta f$ to be significantly larger than $R_S$ lets the light transitions between ports 516 and 517 occur multiple times per symbol period, so that every symbol time slot always receives half the light supplied by optical power supply 103. Choosing $\Delta f$ equal to $R_S$ may result in either constant power during the time interval (A) or in $\sin^2(\pi R_S t)$ shaped pulses during the time intervals (B) and (C) at ports 516 and 517. This particular configuration may be useful for some modes of operation. Similarly, choosing $\Delta f$ equal to an integer multiple of $R_S$ ($\Delta f=n R_S$, n=1, 2, 3, . . . ) may be a beneficial mode of operation.

Figure 7C:
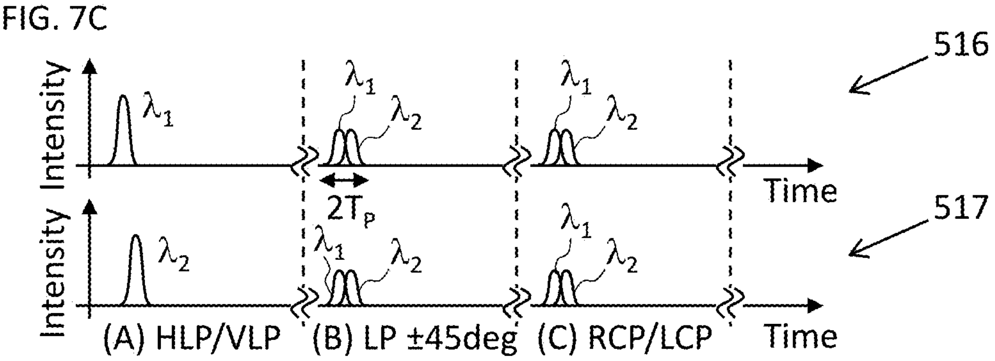

FIG. 7C shows the optical power at the two output ports 516 and 517 of polarization splitter 515 for the example use case, wherein optical power supply 103 operates to transmit temporally partially overlapping pulse trains (i.e., $\Delta T<T_P$) at wavelengths $\lambda_1$ and $\lambda_2$ in HLP and VLP (also see FIG. 3C). Time intervals (A), (B), and (C) correspond to the same three instantiations of random polarization fluctuations as in FIG. 7B. For the time interval (A), polarization splitter 515 operates to: (i) direct the pulse train at wavelength $\lambda_1$ substantially exclusively to output port 516; and (ii) direct the pulse train at wavelength $\lambda_2$ substantially exclusively to output port 517. For the time interval (B), polarization splitter 515 operates to cause each of output ports 516 and 517 to have an approximately equal amount of the pulse train at wavelength $\lambda_1$ and the pulse train at wavelength $\lambda_2$. Likewise, for the time interval (C), polarization splitter 515 operates to cause each of output ports 516 and 517 to have an approximately equal amount of the pulse train at wavelength 21 and the pulse train at wavelength $\lambda_2$. Not shown in FIG. 7C, for time intervals (B) and (C), are possible beat frequency oscillations at the difference frequency $\Delta f=|f_1-f_2|$ during times when pulses at wavelength $\lambda_1$ temporally overlap with pulses at wavelength $\lambda_2$. However, as long as $\Delta f$ is chosen sufficiently large compared to the symbol rate $R_S$, these oscillations may average out within each modulation symbol of transmitter 500 and, as such, may not significantly affect the performance. More precisely, the total optical energy within a time period corresponding to twice the total optical pulse duration $T_P$ measured at the polarization-splitting interface 515 may remain approximately constant, irrespective of the polarization state at the input to polarization splitter 515.

Figure 7D:
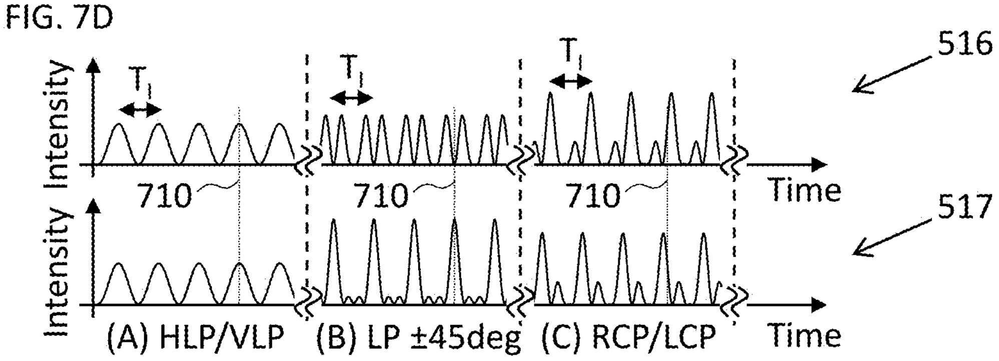

FIG. 7D shows the optical power at the two output ports 516 and 517 of polarization splitter 515 for the example use case, wherein optical power supply 103 operates to transmit four tones separated by $R_I$, two in HLP and two in VLP (also see FIG. 3E). Time intervals (A), (B), and (C) correspond to the same three instantiations of random polarization fluctuations as in FIG. 7B. For the time interval (A), polarization splitter 515 operates to: (i) direct the two lower-frequency tones at frequencies $f_1-R_I/2$ and $f_1+R_I/2$ substantially exclusively to output port 516; and (ii) direct the two higher-frequency tones at frequencies $f_2-R_I/2$ and $f_2+R_I/2$ substantially exclusively to output port 517. In the time domain, output ports 516 and 517 may therefore exhibit time-aligned $\sin^2$-shaped optical intensity pulses. For the time interval (B), polarization splitter 515 operates to cause each of output ports 516 and 517 to have an approximately equal amount of the four tones shown in FIG. 3E. Likewise, for the time interval (C), polarization splitter 515 operates to cause each of output ports 516 and 517 to have an approximately equal amount of the four tones shown in FIG. 3E. Owing to the close spacing of the two lower-frequency tones and the two higher-frequency tones, beat oscillations may be clearly visible in (B) and (C). However, due to the specific nature of the four-tone dual-polarization optical field, the pulse energy may always stay well confined near a common center-of-mass line, e.g., 710, irrespective of polarization rotations. This confinement of pulse energies at a specific temporal location within a symbol period irrespective of polarization rotations on fiber link $\mathbf{102}_6$ may be beneficial for modulation within transmit module 504.

As exemplified by the results graphically shown in FIGS. 7B-7D, the use of various embodiments of optical power supply module 103 beneficially causes polarization splitter 515 to passively perform a substantially equal-power split between output ports 516 and 517 thereof regardless of polarization rotations within one or more sections of non-polarization-maintaining optical fiber disposed between optical power supply module 103 and the host device (e.g., transmit module 504, FIG. 5) of polarization splitter 515. This passive, equal-power split in polarization splitter 515 is enabled, e.g., by the above-described example configurations of optical power supply module 103, according to which the light outputted at output port 242 thereof has two components that are both time/frequency orthogonal to one another and polarization-orthogonal. The latter characteristic of the received light then causes polarization splitter 515 to perform the substantially equal-power split between output ports 516 and 517 thereof passively, i.e., without the use of any tuning or active power-control mechanisms. The light produced at output ports 516 and 517 can then advantageously be used, e.g., as an optical carrier onto which data information can be modulated by transmit module 504.

As a result of the above-described operation of polarization splitter 515, during some time intervals (e.g., time interval (A)) optical modulator $\mathbf{530}_1$ may receive supply light at a first optical center frequency but not at a second optical center frequency, and modulator $\mathbf{530}_2$ may receive supply light at the second optical center frequency but not at the first optical center frequency; during some time intervals (not explicitly shown in FIG. 7) optical modulator $\mathbf{530}_1$ may receive supply light at the second optical center frequency but not at the first optical center frequency, and modulator $\mathbf{530}_2$ may receive supply light at the first optical center frequency but not at the second optical center frequency; during some time intervals (e.g., time intervals (B) and (C)) optical modulator $\mathbf{530}_1$ may receive supply light at both the first optical center frequency and the second optical center frequency, and modulator $\mathbf{530}_2$ may also receive supply light at both the first optical center frequency and the second optical center frequency.

Figure 8:
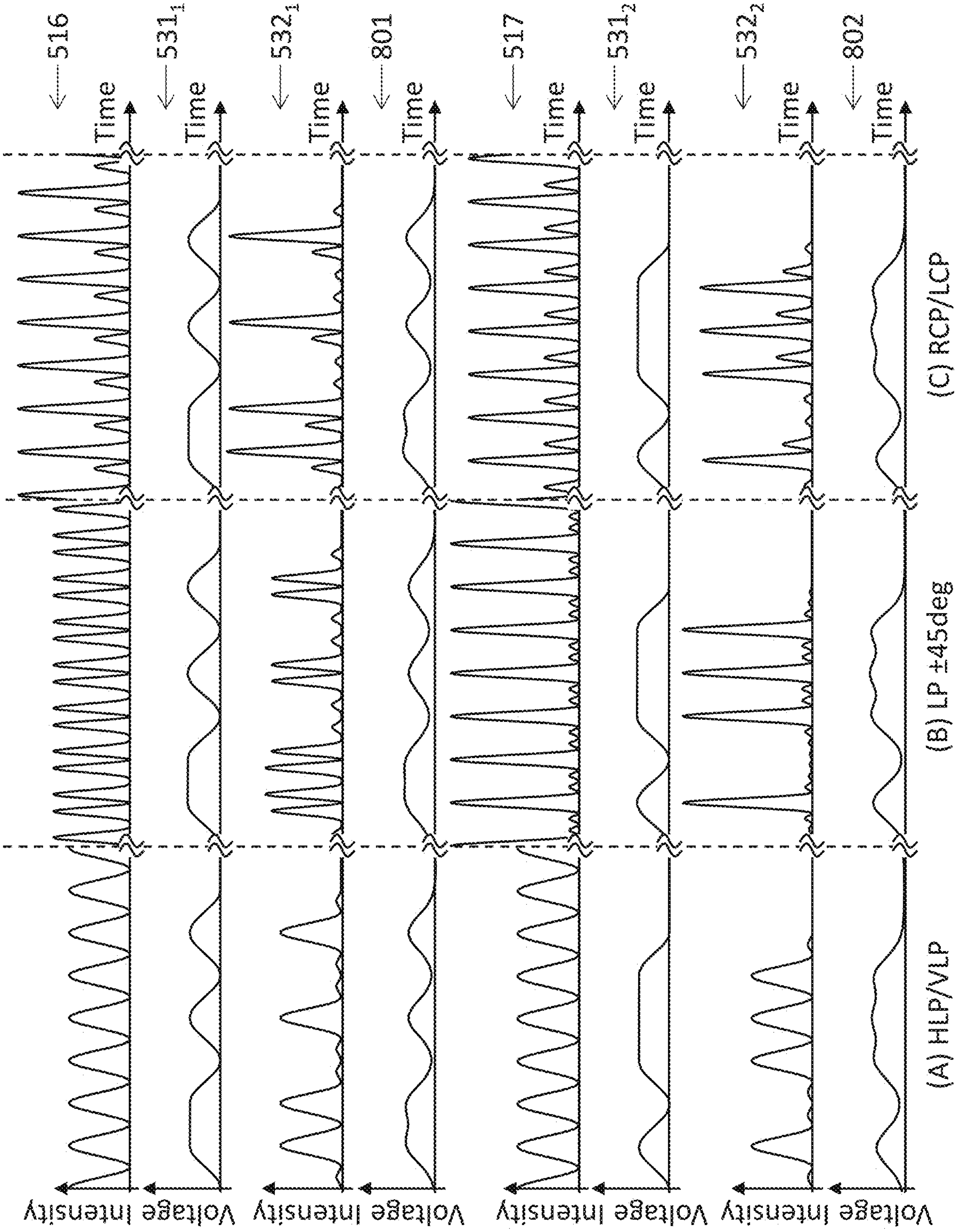
FIG. 8 graphically illustrates some signals used/generated in the optical transmitter of FIG. 5 and the corresponding electrical signals recovered by a corresponding optical receiver according to an example embodiment.

FIG. 8 graphically illustrates some signals used/generated in optical transmitter 500 (FIG. 5) and the corresponding electrical signals recovered by a corresponding optical data receiver according to an example embodiment. More specifically, the following time-dependent signals are shown in FIG. 8:

(i) light supply waveforms at ports 516 and 517, respectively, corresponding to the embodiment of FIG. 3E. These waveforms are shown for three different polarization rotations in optical fiber 543, i.e., for time intervals (A), (B), and (C), as per FIG. 7D;

(ii) electrical drive signals $\mathbf{531}_1$ and $\mathbf{531}_2$ driving optical modulators $\mathbf{530}_1$ and $\mathbf{530}_2$, FIG. 5. For illustration purposes, the modulation format imprinted onto the supply light is binary on/off keying (OOK) in this example embodiment (a person of ordinary skill in the art will understand that any other optical modulation format may also be imprinted onto the supply light, including multi-level and multi-dimensional formats using any physical modulation dimension of the supply light's optical field, such as its amplitude, phase, in-phase/quadrature components, frequency, and polarization). The exemplary binary data sequence represented by electrical drive signal $\mathbf{531}_1$ is [01101010 . . . 01101010 . . . 01101010]. The exemplary binary data sequence represented by electrical drive signal $\mathbf{531}_2$ is [01011100 . . . 01011100 . . . 01011100];

(iii) modulated optical output signals $\mathbf{532}_1$ and $\mathbf{532}_2$ generated by transmit module 504 in response to the shown electrical drive signals $\mathbf{531}_1$ and $\mathbf{531}_2$, respectively; and (iv) electrical signals 801 and 802 generated by a direct-detection optical receiver in response to the shown modulated optical output signals $\mathbf{532}_1$ and $\mathbf{532}_2$, respectively. The direct-detection optical receiver is modeled to have a first-order Gaussian low-pass characteristic of an electrical bandwidth equal to the symbol rate.

The accurate and substantially jitter-free reconstruction of electrical data signals $\mathbf{531}_1$ and $\mathbf{532}_2$ by electrical signals 801 and 802 is evident, irrespective of the polarization rotation exerted by optical fiber 543.

According to an example embodiment disclosed above, e.g., in the summary section and/or in reference to any one or any combination of some or all of FIGS. 1-8, provided is an apparatus (e.g., 100, FIG. 1) for communicating optical signals modulated at a symbol rate (e.g., $R_S$), the apparatus comprising an optical power supply (e.g., 290, FIG. 2) that comprises: a light source (e.g., 200, FIG. 2) and an electronic controller (e.g., 230, FIG. 2) connected to the light source to cause the light source to generate a first light output having a first optical frequency (e.g., 212, FIGS. 2 and 3) and a second light output having a second optical frequency (e.g., 222, FIGS. 2 and 3) different from the first optical frequency, each of the first and second light outputs being steady during a time interval that is significantly longer (e.g., by a factor of 100) than one over the symbol rate; and a polarization combiner (e.g., 240, FIG. 2) connected to receive the first and second light outputs of the light source at different respective input ports thereof, the polarization combiner being configured to generate, at an output port thereof, an optical output in which first and second mutually orthogonal polarization components carry light of the first and second light outputs, respectively.

In some embodiments of the above apparatus, the electronic controller is configured to cause the first light output and the second light output to be mutually time/frequency orthogonal (e.g., as per Eqs. (3) and (4)).

In some embodiments of any of the above apparatus, a degree to which the first light output and the second light output are time/frequency orthogonal is greater than 0.8.

In some embodiments of any of the above apparatus, the degree is greater than 0.9.

In some embodiments of any of the above apparatus, the degree is greater than 0.99.

In some embodiments of any of the above apparatus, the first light output comprises a first continuous-wave optical field at the first optical frequency, and the second light output comprises a second continuous-wave optical field at the second optical frequency.

In some embodiments of any of the above apparatus, a difference between the first optical frequency and the second optical frequency is greater than five times the symbol rate (e.g., $\Delta f=|f_1-f_2|>5\ R_I$, 212, 222, FIG. 3D).

In some embodiments of any of the above apparatus, a difference between the first optical frequency and the second optical frequency is approximately an integer multiple of the symbol rate (i.e., $\Delta f \approx n\ R_I$, with n=2,3,4, . . . ).

In some embodiments of any of the above apparatus, the first light output comprises a first optical pulse train of a first period, and the second light output comprises a second optical pulse train of the first period.

In some embodiments of any of the above apparatus, pulses of the first and second optical pulse trains have a same intensity waveform (e.g., 212, 222, FIG. 3C).

In some embodiments of any of the above apparatus, pulses of the first and second optical pulse trains have different respective intensity waveforms.

In some embodiments of any of the above apparatus, the first and second optical pulse trains are phase-locked with respect to one another.

In some embodiments of any of the above apparatus, centers of pulses of the first optical pulse train are temporally aligned with centers of corresponding pulses of the second optical pulse train (e.g., $\Delta T \approx 0$, 212, 222, FIG. 3C).

In some embodiments of any of the above apparatus, centers of pulses of the first optical pulse train are temporally offset from centers of corresponding pulses of the second optical pulse train by a nonzero time shift (e.g., $\Delta T$, 212, 222, FIG. 3C).

In some embodiments of any of the above apparatus, the nonzero time shift is smaller than one half the first period (e.g., $\Delta T<T_I/2$, 212, 222, FIG. 3C).

In some embodiments of any of the above apparatus, the nonzero time shift is smaller than one quarter of the first period (e.g., $\Delta T<T_I/4$, 212, 222, FIG. 3C).

In some embodiments of any of the above apparatus, the difference between the first optical frequency and the second optical frequency is twice the pulse repetition rate (i.e., $\Delta f \approx 2\ R_I$, 212, 222, FIG. 3E).

In some embodiments of any of the above apparatus, the difference between the first optical frequency and the second optical frequency is three times the pulse repetition rate (i.e., $\Delta f \approx 3\ R_I$).

In some embodiments of any of the above apparatus (e.g., 212, 222, FIG. 3E; 516, 517, FIG. 6D) a spectrum of the first pulse train has two first optical frequency tones; and a spectrum of the second pulse train has two second optical frequency tones different from the two first optical frequency tones.

In some embodiments of any of the above apparatus, the first and second optical frequency tones are equidistantly spaced by an integer multiple of the symbol rate.

In some embodiments of any of the above apparatus, the integer multiple is two.

In some embodiments of any of the above apparatus, the electronic controller is further configured to imprint first control information on the first light output of the light source and second control information on the second light output of the light source.

In some embodiments of any of the above apparatus, the first control information is identical to the second control information.

In some embodiments of any of the above apparatus, the electronic controller imprints the first and second control information using one or more of: an intensity, a phase, a frequency, and a polarization of the first light output and the second light output.

In some embodiments of any of the above apparatus, the light source comprises a first CW laser oscillating at the first optical frequency (e.g., 410, FIG. 4A), and a second CW laser oscillating at the second optical frequency (e.g., 420, FIG. 4A).

In some embodiments of any of the above apparatus, the electronic controller is configured to control the first CW laser and the second CW laser (e.g., 430, FIG. 4A) to controllably set a frequency difference between the first and second optical frequencies.

In some embodiments of any of the above apparatus, the polarization combiner comprises one or more of: a polarization beam combiner, a polarization-maintaining optical power combiner, and a polarization-maintaining wavelength multiplexer.

In some embodiments of any of the above apparatus, the light source comprises a CW laser and an optical modulator optically connected to the CW laser, the optical modulator configured to generate a first modulation tone at the first optical frequency (e.g., 424, FIG. 4B; 417, FIG. 4C).

In some embodiments of any of the above apparatus, the electronic controller (e.g., 432, FIG. 4B; 433, FIG. 4C) is configured to control an optical frequency of the first modulation tone.

In some embodiments of any of the above apparatus, the optical modulator is further configured to generate a second modulation tone at the second optical frequency (e.g., 417, FIG. 4B).

In some embodiments of any of the above apparatus, the light source comprises an optical amplitude modulator configured to generate an optical pulse train (e.g., 417, 427, FIG. 4D; 417, FIG. 4E).

In some embodiments of any of the above apparatus, the light source comprises a pulsed laser configured to generate an optical pulse train (e.g., 410 and 417, 420 and 427, FIG. 4C).

In some embodiments of any of the above apparatus, the light source comprises an optical delay element configured to delay the first light output with respect to the second light output (e.g., 419, FIGS. 4D and 4E).

In some embodiments of any of the above apparatus, the optical power supply comprises an optical dispersion-compensating element (e.g., 470, FIGS. 4D and 4E).

In some embodiments of any of the above apparatus, the light source comprises a polarization-diversity in-phase/quadrature modulator (e.g., 417, FIG. 4F).

In some embodiments of any of the above apparatus (e.g., 212, 222, FIG. 3E): the polarization-diversity in-phase/quadrature modulator is configured to generate two tones in a first polarization and two tones in a second polarization orthogonal to the first polarization; wherein frequency spacing between the two tones in the first polarization and frequency spacing between the two tones in the second polarization are equal to one another; and wherein frequency spacing between a tone in the first polarization and a tone in the second polarization is an integer multiple of said equal frequency spacing.

In some embodiments of any of the above apparatus, the phase difference between the two tones in the first polarization is equal to the phase difference between the two tones in the second polarization.

In some embodiments of any of the above apparatus, the apparatus further comprises an optical transmit module (e.g., 504, FIG. 5; 600, FIG. 6) optically end-connected to the output port of the polarization combiner (e.g., 240, FIG. 2) via one or more sections of optical fiber (e.g., $\mathbf{102}_6$, 543, FIG. 5), the transmit module comprising: a polarization splitter (e.g., 515, FIG. 5) having an input port thereof optically connected to an end of one of the sections of the optical fiber to receive light of the optical output; a first optical data modulator (e.g., $\mathbf{530}_1$, FIG. 5) connected to a first output of the polarization splitter; and a second optical data modulator (e.g., $\mathbf{530}_2$, FIG. 5) connected to a second output of the polarization splitter.

In some embodiments of any of the above apparatus, at least one of the first and second optical data modulators is configured to modulate received light at the symbol rate.

In some embodiments of any of the above apparatus, at least one of the one or more sections of the optical fiber is non-polarization-maintaining.

In some embodiments of any of the above apparatus, the optical fiber is at least one meter long.

In some embodiments of any of the above apparatus, the optical fiber is at least ten meters long.

According to another example embodiment disclosed above, e.g., in the summary section and/or in reference to any one or any combination of some or all of FIGS. 1-8, provided is an apparatus comprising an optical transmitter (e.g., 500, FIG. 5) that comprises: a passive polarization splitter (e.g., 515, FIG. 5) having an optical input port and first (e.g., 516, FIG. 5) and second (e.g., 517, FIG. 5) optical output ports, the optical input port being optically connected to receive an optical input signal having first and second polarization components (e.g., FIGS. 3A-3E), the first polarization component carrying light of a first optical frequency, the second polarization component carrying light of a second optical frequency different from the first optical frequency, the first and second polarization components being mutually orthogonal and jointly undergoing a state-of-polarization change during a time interval (e.g., intervals (A), (B), (C), FIGS. 7B-7D), the passive polarization splitter causing light of a first fixed polarization to be directed from the optical input port to the first optical output port and also causing light of a second fixed polarization to be directed from the optical input port to the second optical output port, the first and second fixed polarizations being orthogonal to one another, the state-of-polarization change causing respective spectral compositions of the lights directed to the first and second optical ports to change during said time interval (e.g., FIGS. 7B-7D); and a first optical modulator (e.g., $\mathbf{530}_1$, FIG. 5) connected to the first optical output port and configured to modulate the light of the first fixed polarization received therefrom (e.g., 516, FIG. 5) in response to a first data signal (e.g., Data 1, FIG. 5).

In some embodiments of the above apparatus, the optical transmitter further comprises a second optical modulator (e.g., $\mathbf{530}_2$, FIG. 5) connected to the second optical output port and configured to modulate the light of the second fixed polarization received therefrom (e.g., 517, FIG. 5) in response to a second data signal (e.g., Data 2, FIG. 5).

In some embodiments of any of the above apparatus, the first and second optical modulators are connected to transmit the respective modulated lights (e.g., on ports $\mathbf{532}_1$ and $\mathbf{532}_2$, FIG. 5) through different respective optical fibers.

In some embodiments of any of the above apparatus, at some times of said time interval (e.g., interval (A), FIGS. 7B-7D), the first optical modulator receives from the first output port the first optical frequency but not the second optical frequency; and at some other times of said time interval, the first optical modulator receives from the first output port the second optical frequency but not the first optical frequency.

In some embodiments of any of the above apparatus, at yet some other times of said time interval, the first optical modulator receives from the first output port a mix of the first and second optical frequencies (e.g., intervals (B), (C), FIGS. 7B-7D).

In some embodiments of any of the above apparatus, the optical input port is optically connected to receive the optical input signal from a proximate end of a section of optical fiber (e.g., 543, FIG. 5), the optical fiber including at least one section that is non-polarization-maintaining.

In some embodiments of any of the above apparatus, the state-of-polarization change is due to time-varying polarization rotation in said at least one section.

In some embodiments of any of the above apparatus, the time-varying polarization rotation is random.

In some embodiments of any of the above apparatus, the optical transmitter further comprises an optical power supply (e.g., 290, FIG. 5) optically connected to apply the optical input signal through the optical fiber to the passive polarization splitter.

In some embodiments of any of the above apparatus, the optical power supply comprises: a light source (e.g., 200, FIG. 2) and an electronic controller (e.g., 230, FIG. 2) connected to the light source to cause the light source to generate a first light output having the first optical frequency (e.g., 212, FIGS. 2 and 3) and a second light output having the second optical frequency (e.g., 222, FIGS. 2 and 3), each of the first and second light outputs being steady during said time interval; and a polarization combiner (e.g., 240, FIG. 2) connected to receive the first and second light outputs of the light source at different respective input ports thereof, the polarization combiner being configured to generate, at an output port thereof, an optical output that is coupled into the optical fiber to cause the optical input port of the polarization splitter to receive the optical input signal.

In some embodiments of any of the above apparatus, the first optical modulator is a polarization-sensitive device designed to modulate optical signals having the first fixed polarization.

In some embodiments of any of the above apparatus, the first optical modulator is unsuitable for modulating optical signals having the second fixed polarization.

In some embodiments of any of the above apparatus, the second optical modulator is a polarization-sensitive device designed to modulate optical signals having the second fixed polarization.

In some embodiments of any of the above apparatus, the second optical modulator is unsuitable for modulating optical signals having the first fixed polarization.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first light output and the second light output of the light source at a first input port and a second input port, respectively, the polarization combiner being configured to generate, at a single output port thereof, an optical output signal in which first and second mutually orthogonal polarization components carry light of the first and second light outputs, respectively, wherein the polarization combiner includes no more than one output port, and is configured to multiplex light in a first polarization state at the first input port onto the first polarization state of light on the output port, and light in a second polarization state at the second input port onto the second polarization state of light on the same output port;

a transmit module configured to receive the optical output signal irrespective of polarization changes of the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module.

2. The apparatus of claim 1, wherein the light source comprises an electronic controller configured to cause the first light output and the second light output to be mutually time/frequency orthogonal.

3. The apparatus of claim 1, wherein the first light output comprises a first continuous-wave optical field at the first optical frequency, and the second light output comprises a second continuous-wave optical field at the second optical frequency.

4. The apparatus of claim 1, wherein a difference between the first optical frequency and the second optical frequency is approximately an integer multiple of the symbol rate.

5. The apparatus of claim 1, wherein the first light output comprises a first optical pulse train of a first period, and the second light output comprises a second optical pulse train of the first period.

6. The apparatus of claim 5, wherein centers of pulses of the first optical pulse train are temporally aligned with centers of corresponding pulses of the second optical pulse train.

7. The apparatus of claim 5, wherein centers of pulses of the first optical pulse train are temporally offset from centers of corresponding pulses of the second optical pulse train by a nonzero time shift.

8. The apparatus of claim 5, wherein:

a spectrum of the first pulse train has two first optical frequency tones; and a spectrum of the second pulse train has two second optical frequency tones different from the two first optical frequency tones.

9. The apparatus of claim 1, wherein the light source comprises an electronic controller configured to imprint first control information on the first light output of the light source and second control information on the second light output of the light source.

10. The apparatus of claim 1, wherein the light source comprises a polarization-diversity in-phase/quadrature modulator.

11. The apparatus of claim 10, wherein the polarization-diversity in-phase/quadrature modulator is configured to generate two tones in a first polarization and two tones in a second polarization orthogonal to the first polarization;

wherein frequency spacing between the two tones in the first polarization and frequency spacing between the two tones in the second polarization are equal to one another; and wherein frequency spacing between a tone in the first polarization and a tone in the second polarization is an integer multiple of said equal frequency spacing.

12. The apparatus of claim 1, wherein the transmit module comprises:

a polarization splitter having an input port thereof optically connected to an end of one of the sections of the optical fiber to receive light of the optical output signal;

a first optical data modulator connected to a first output of the polarization splitter; and a second optical data modulator connected to a second output of the polarization splitter.

13. The apparatus of claim 1, wherein the transmit module comprises a polarization splitter having an input port optically connected to an end of one of the sections of the non-polarization-maintaining fiber to receive light of the optical output signal, wherein the polarization splitter has a first output port and a second output port, and the polarization splitter is configured to perform a substantially equal-power split between the first output port and the second output port regardless of polarization rotations within the one or more sections of non-polarization-maintaining optical fiber between the polarization combiner and the transmit module.

14. The apparatus of claim 1 wherein the second polarization state at the output port is approximately orthogonal to the first polarization state at the output port.

15. The apparatus of claim 1 wherein the two orthogonal polarization states at the output port are horizontally and vertically linearly polarized, respectively.

16. The apparatus of claim 1 wherein the two orthogonal polarization states at the output port are left-handed and right-handed circularly polarized, respectively.

17. The apparatus of claim 1 wherein the two orthogonal polarization states at the output port are relatively orthogonally, elliptically polarized states.

18. The apparatus of claim 1 wherein the second polarization state at the second input port is approximately identical to the first polarization state at the first input port.

19. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source at different respective input ports thereof, the polarization combiner being configured to generate, at an output port thereof, an optical output signal in which first and second mutually orthogonal polarization components carry light of the first and second light outputs, respectively, wherein the polarization combiner comprises a polarization-maintaining optical power combiner;

a transmit module configured to receive the optical output signal irrespective of polarization changes of the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module.

20. The apparatus of claim 19 wherein the light source comprises an electronic controller configured to cause the first light output and the second light output to be mutually time/frequency orthogonal.

21. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source at different respective input ports thereof, the polarization combiner being configured to generate, at an output port thereof, an optical output signal in which first and second mutually orthogonal polarization components carry light of the first and second light outputs, respectively, wherein the polarization combiner comprises a polarization-maintaining wavelength multiplexer;

a transmit module configured to receive the optical output signal irrespective of polarization changes of the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module.

22. The apparatus of claim 21 wherein the light source comprises an electronic controller configured to cause the first light output and the second light output to be mutually time/frequency orthogonal.

23. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source at different respective input ports thereof, the polarization combiner being configured to generate, at an output port thereof, an optical output signal in which first and second mutually orthogonal polarization components carry light of the first and second light outputs, respectively;

a transmit module configured to receive the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module;

wherein the transmit module comprises a polarization splitter having an input port optically connected to an end of one of the sections of the non-polarization-maintaining fiber to receive light of the optical output signal, and wherein the polarization splitter has a first output port and a second output port, and the polarization splitter is configured to perform a substantially equal-power split between the first output port and the second output port regardless of polarization rotations within the one or more sections of non-polarization-maintaining optical fiber between the polarization combiner and the transmit module.

24. The apparatus of claim 23 wherein the light source comprises an electronic controller configured to cause the first light output and the second light output to be mutually time/frequency orthogonal.

25. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source at different respective input ports thereof, the polarization combiner being configured to generate, at an output port thereof, an optical output signal in which first and second mutually orthogonal polarization components carry light of the first and second light outputs, respectively;

a transmit module configured to receive the optical output signal irrespective of polarization changes of the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module;

wherein the light source comprises a polarization-diversity in-phase/quadrature modulator that is configured to generate two tones in a first polarization and two tones in a second polarization orthogonal to the first polarization;

wherein frequency spacing between the two tones in the first polarization and frequency spacing between the two tones in the second polarization are equal to one another; and wherein frequency spacing between a tone in the first polarization and a tone in the second polarization is an integer multiple of said equal frequency spacing.

26. The apparatus of claim 25 wherein a difference between the first optical frequency and the second optical frequency is approximately an integer multiple of the symbol rate.

27. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate;

a polarization combiner connected to receive the first and second light outputs of the light source at different respective input ports thereof, the polarization combiner being configured to generate, at an output port thereof, an optical output signal in which first and second mutually orthogonal polarization components carry light of the first and second light outputs, respectively;

a first polarization maintaining element disposed in an optical path of the first light output between the light source and the polarization combiner; and a second polarization maintaining element disposed in an optical path of the second light output between the light source and the polarization combiner;

a transmit module configured to receive the optical output signal irrespective of polarization changes of the optical output signal, the transmit module including at least one optical modulator configured to modulate the optical output signal from the output port of the polarization combiner; and an optical fiber that includes one or more sections of non-polarization-maintaining fiber, in which the optical fiber is optically coupled between the output port of the polarization combiner and the transmit module, and the optical fiber is configured to transmit the optical output signal from the output port of the polarization combiner to the transmit module.

28. The apparatus of claim 27 wherein the first polarization maintaining element comprises a first polarization-maintaining optical amplifier.

29. The apparatus of claim 28 wherein the second polarization maintaining element comprises a second polarization-maintaining optical amplifier.

30. The apparatus of claim 27 wherein the light source comprises an electronic controller configured to cause the first light output and the second light output to be mutually time/frequency orthogonal.

31. An apparatus for communicating optical signals modulated at a symbol rate, the apparatus comprising:

an optical power supply that comprises:

a light source configured to generate a first light output having a first optical frequency and a second light output having a second optical frequency different from the first optical frequency, each of the first and second light outputs being steady during a time interval that is significantly longer than one over the symbol rate; and a polarization combiner connected to receive the first and second light outputs of the light source, the polarization combiner being configured to generate, at an output port thereof, an optical output signal in which first and second mutually orthogonal polarization components carry light of the first and second light outputs, respectively;

an optical fiber that includes one or more sections of non-polarization-maintaining fiber, the optical fiber having a first end and a second end, the first end being optically connected to the output port of the polarization combiner;

a transmit module optically connected to the second end of the optical fiber and configured to receive the optical output signal of the polarization combiner transmitted through the optical fiber irrespective of polarization changes of the optical output signal, wherein the transmit module comprises:

a polarization splitter having an input port thereof optically connected to an end of one of the sections of the optical fiber to receive light of the optical output signal, the polarization splitter comprising a first output and a second output;

a first optical data modulator connected to the first output of the polarization splitter and configured to modulate a first portion of the optical output signal; and a second optical data modulator connected to the second output of the polarization splitter and configured to modulate a second portion of the optical output signal.

32. The apparatus of claim 31, wherein the light source comprises an electronic controller configured to cause the first light output and the second light output to be mutually time/frequency orthogonal.

33. The apparatus of claim 31 wherein the first light output comprises a first continuous-wave optical field at the first optical frequency, and the second light output comprises a second continuous-wave optical field at the second optical frequency.

34. The apparatus of claim 31 wherein a difference between the first optical frequency and the second optical frequency is approximately an integer multiple of the symbol rate.

35. The apparatus of claim 31 wherein the first light output comprises a first optical pulse train of a first period, and the second light output comprises a second optical pulse train of the first period.

* * * * *